United States Patent [19]

Ookubo et al.

[11] Patent Number: 5,146,071

[45] Date of Patent: Sep. 8, 1992

[54] OPTICAL LENS SYSTEM-DRIVING CONTROL APPARATUS FOR MICROSCOPICALLY DRIVING A PLURALITY OF LENS GROUPS

[75] Inventors: Mitsumasa Ookubo; Tsuyoshi Yaji; Yasushi Toizumi; Toyoji Sasaki; Shigeru Kato, all of Hachioji; Tetsuo Miyasaka, Kanagawa; Yasushi Odanaka, Tokyo; Masafumi Yamashaki, Hachioji; Shinichi Kodama, Hino, all of Japan

[73] Assignee: Olympus Optical Co., Ltd., Tokyo, Japan

[21] Appl. No.: 691,064

[22] Filed: Apr. 23, 1991

[30] Foreign Application Priority Data

Apr. 24, 1990 [JP]  Japan .................................. 2-106393
Jun. 5, 1990 [JP]  Japan .................................. 2-146794

[51] Int. Cl.$^5$ ........................... G03B 3/00; G01J 1/20
[52] U.S. Cl. ................. 250/201.2; 359/698; 354/402
[58] Field of Search ................. 359/698, 697, 696; 250/201.2, 201.7, 201.8; 354/400, 402

[56] References Cited

U.S. PATENT DOCUMENTS

| | | | |
|---|---|---|---|
| 4,043,642 | 8/1977 | Hirose et al. | 350/184 |
| 4,161,756 | 7/1979 | Thomas | 358/225 |
| 4,697,891 | 10/1987 | Kawai | 359/696 |
| 4,735,494 | 4/1988 | Makino et al. | 359/698 |
| 4,881,799 | 11/1989 | Ohno et al. | 359/698 |
| 5,027,147 | 6/1991 | Kaneda | 354/400 |
| 5,038,163 | 8/1991 | Hirasawa | 354/400 |
| 5,066,968 | 11/1991 | Suzuki et al. | 354/400 |
| 5,075,713 | 12/1991 | Sakata | 354/400 |

*Primary Examiner*—David C. Nelms
*Assistant Examiner*—Michael Messinger
*Attorney, Agent, or Firm*—Frishauf, Holtz, Goodman & Woodward

[57] ABSTRACT

A plurality of lens groups are moveable in the direction of an optical axis. A plurality of motors are provided for the lens groups, respectively. A driving circuit drives the motors. A switching section sequentially selects the motors and connects the selected motors to the driving circuit. A lens position-detecting section detects the positions of the lens groups. A driving control section sequentially drives the lens groups in accordance with intermediate target position data, respectively, via the switching section and the driving section, and determines whether the lens groups have reached their respective intermediate target positions, on the basis of the detection performed by the lens position-detecting section. When the driving control section determines that the lens groups have reached their respective intermediate target positions, it demands next intermediate target positions, which are slightly away from the initially-determined intermediate target positions. On the basis of the next intermediate target positions, the lens groups are driven again. With this operation repeated, the driving control section controls the driving of the lens groups until these lens groups reach their respective final target positions.

24 Claims, 32 Drawing Sheets

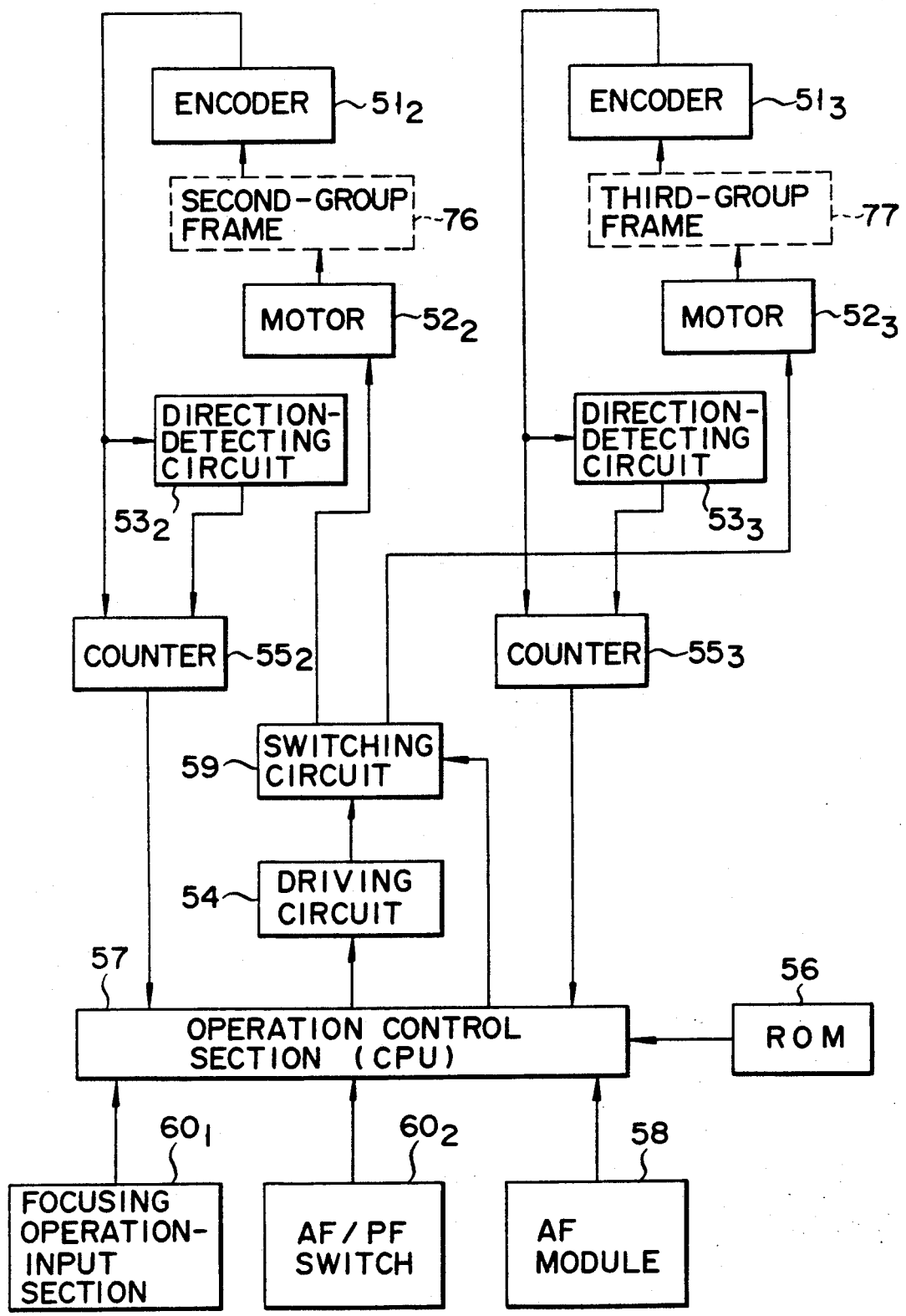
F I G. 1A

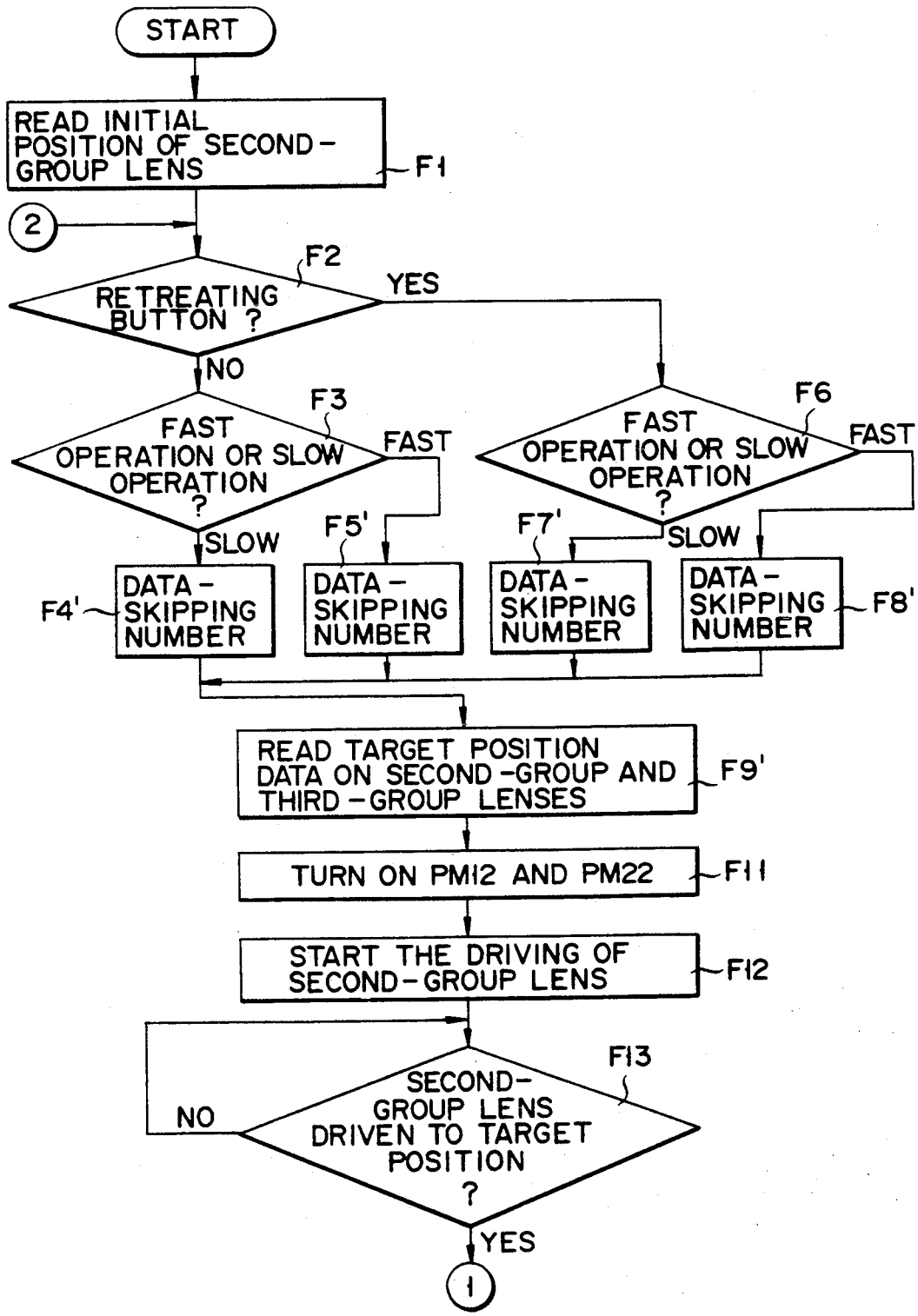
F I G. 11A

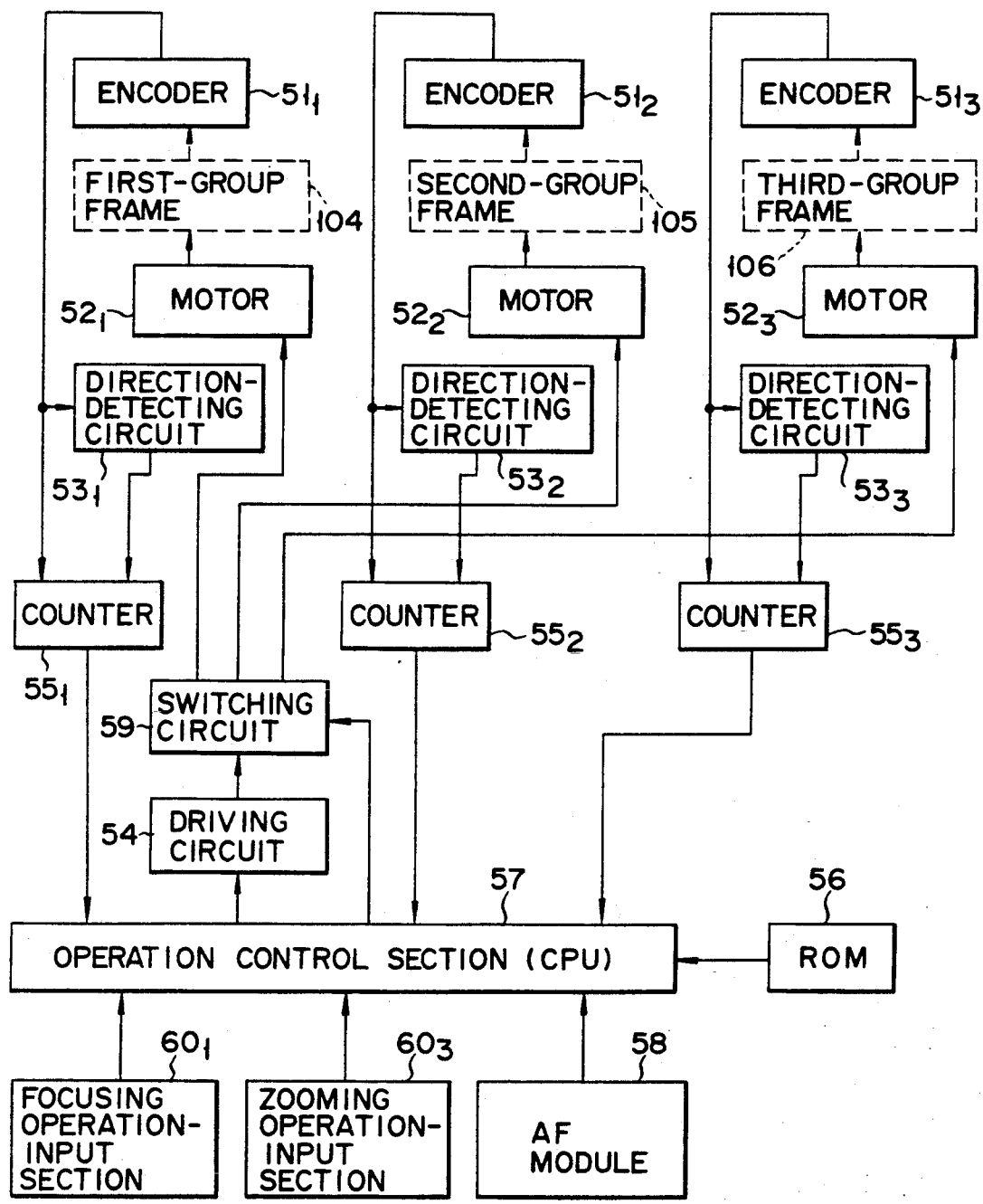
F I G. 15

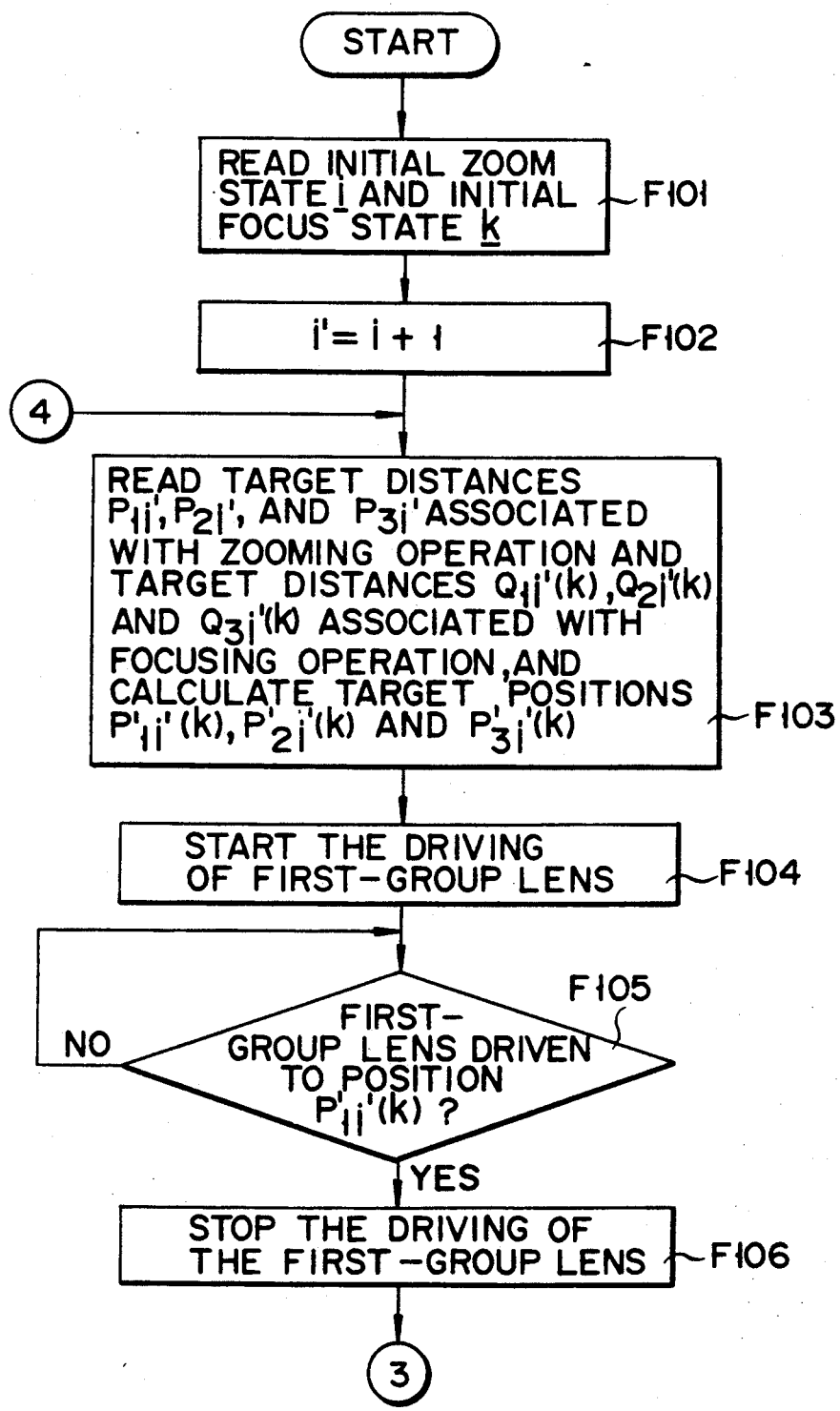
F I G. 16A

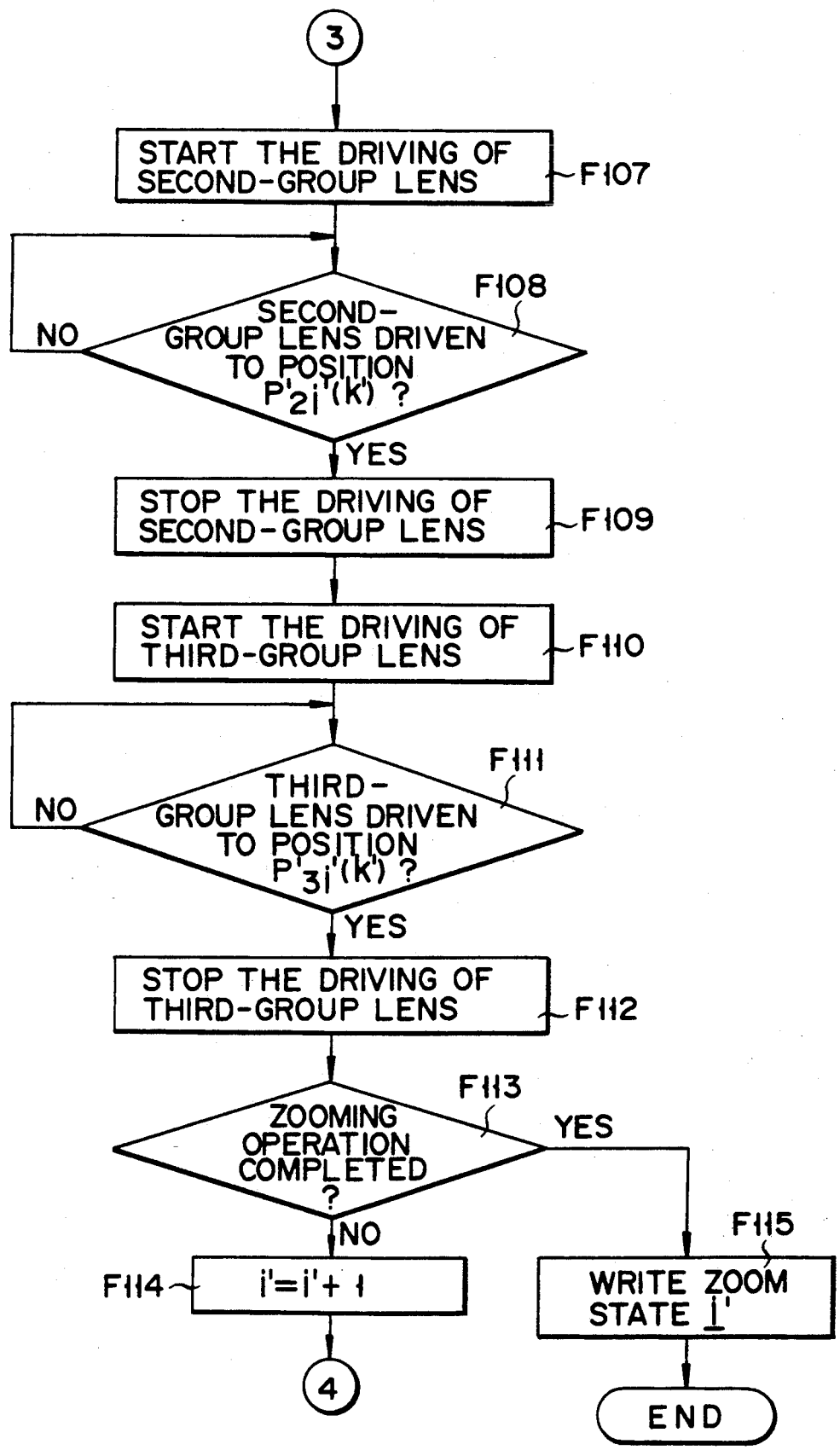
F I G. 16B

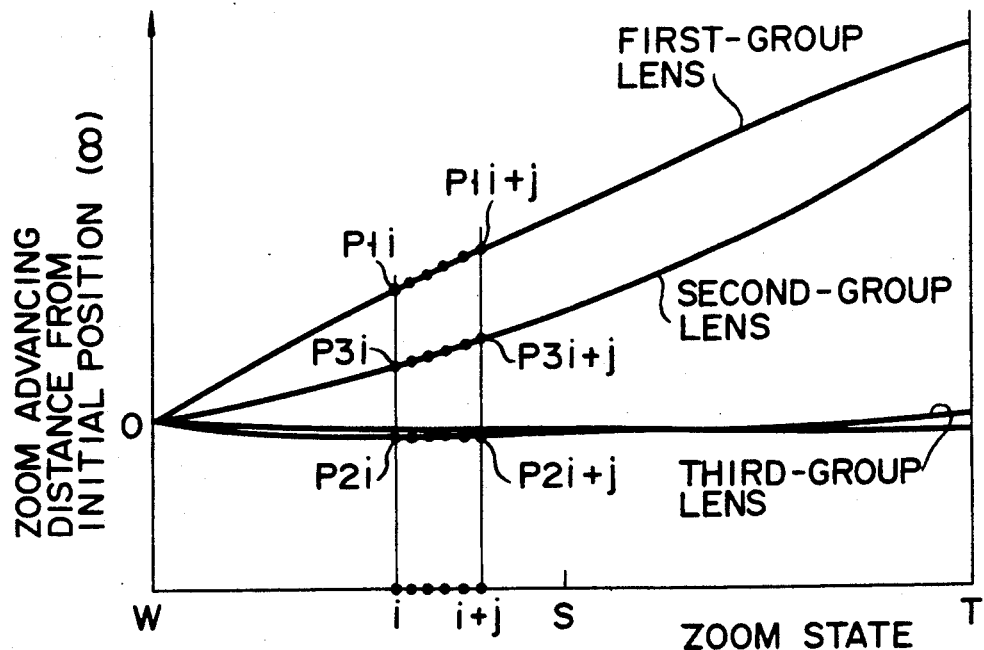
F I G. 17
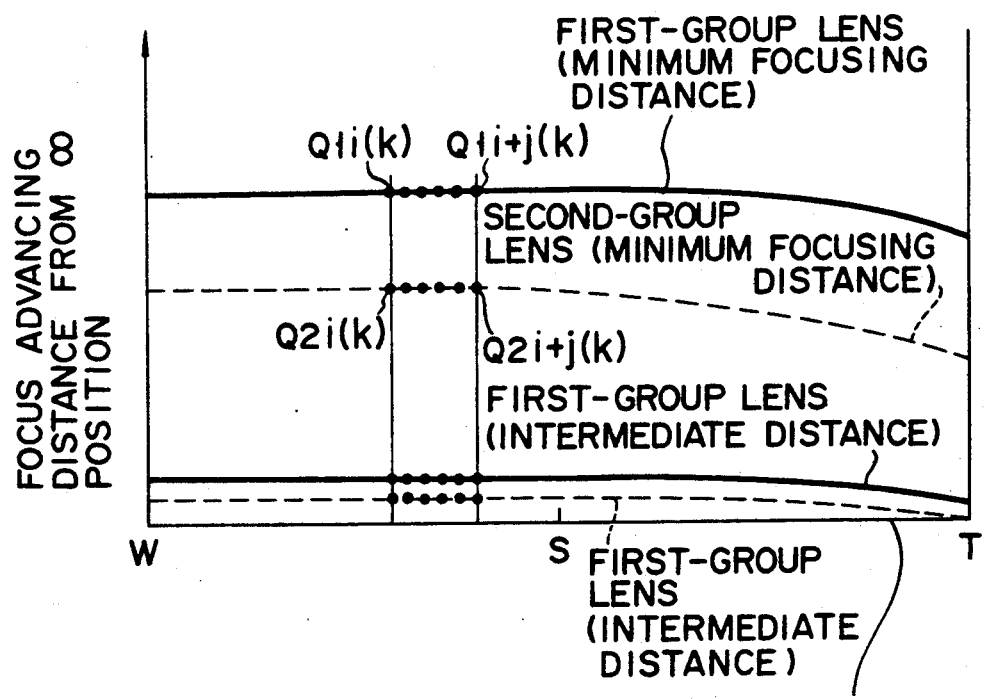
F I G. 18

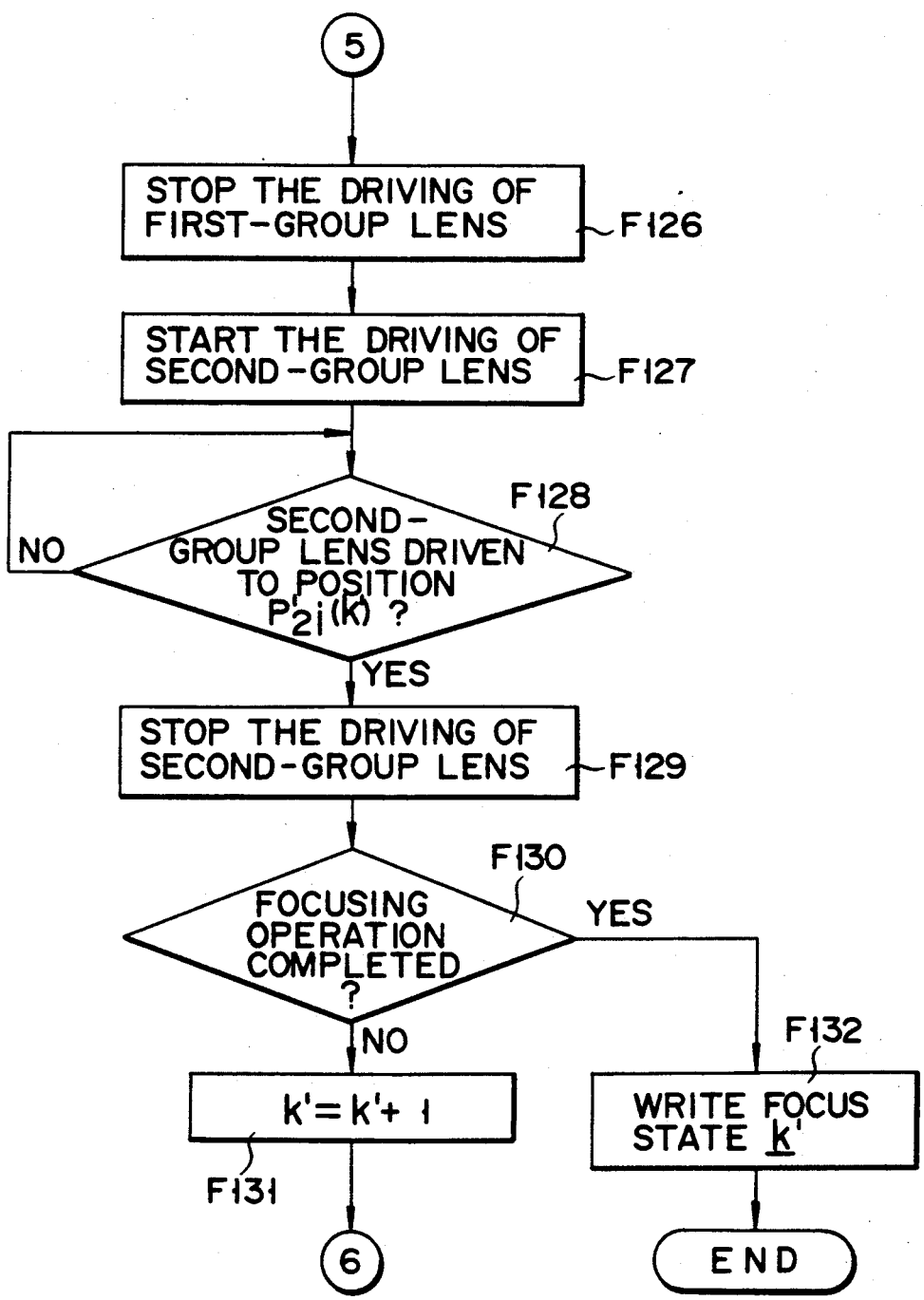
F I G. 19B

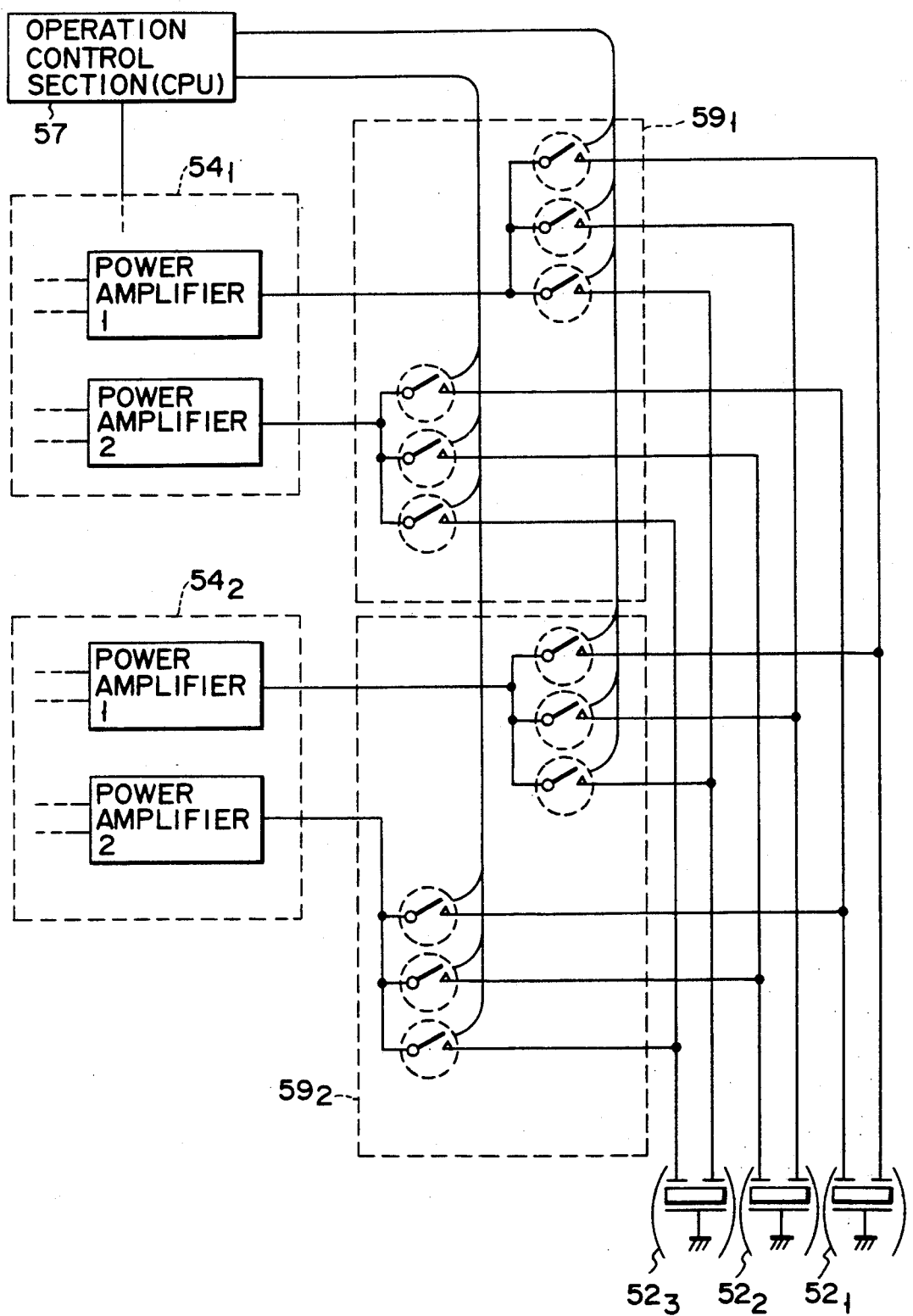
F I G. 22

| DISTANCE DATA | ADDRESS | DATA | |
|---|---|---|---|
| | | EXAMPLE | INFINITY |
| (INFINITY) ∞ | 0 0 | DR10 | 0 0 |
| | 0 1 | DR20 | 0 0 |
| 10 m | 0 2 | DR11 | 0 1 |
| | 0 3 | DR21 | 0 1 |
| 5 m | 0 4 | DR12 | 0 2 |
| | 0 5 | DR22 | 0 2 |
| 3 m | 0 6 | DR13 | 0 4 |
| | 0 7 | DR23 | 0 3 |
| 2.5 m | 0 8 | DR14 | 0 5 |
| | 0 9 | DR24 | 0 4 |
| 2 m | 0 A | DR15 | 0 7 |
| | 0 B | DR25 | 0 6 |
| 1.7 m | 0 C | DR16 | 0 A |
| | 0 D | DR26 | 0 8 |
| 1.4 m | 0 E | DR17 | 0 D |
| | 0 F | DR27 | 0 A |
| 1.3 m | 1 0 | DR18 | 0 F |
| | 1 1 | DR28 | 0 C |
| 1.1 m | 1 2 | DR19 | 1 1 |
| | 1 3 | DR29 | 0 D |

FIG. 32

OPTICAL LENS SYSTEM-DRIVING CONTROL APPARATUS FOR MICROSCOPICALLY DRIVING A PLURALITY OF LENS GROUPS

BACKGROUND OF THE INVENTION

1. Field of the Invention

The present invention relates to an optical lens system-driving control apparatus. More specifically, the present invention relates to a driving control apparatus which is incorporated in a camera having a plurality of lens groups movable in the optical axis direction and which microscopically drives the lens groups, for the purpose of zooming or focusing. The present invention also relates to a driving control apparatus which is used with a lens barrel having a plurality of lens groups and which microscopically drives the lens groups independently of one another.

2. Description of the Related Art

In general, an optical lens system including a plurality of lens groups is driven by employing a cam cylinder. In the case where the cam cylinder is employed, the movement of each lens group is dependent on the shape of the cam. However, since it is difficult to provide the cam with a complicated shape, the lens groups cannot be moved in such a complicated manner as is required in a recently-developed compact and multi-function camera.

If the lens groups are driven by their respective motors, they can be moved in a complicated manner. However, the movement of the lens groups has to be controlled with high accuracy. If not, the lens groups may obstruct each other or collide with each other In addition, another problem may occur, as will be discussed below.

The conventional techniques and the entailed problems will be considered, referring to the photographing lens and lens barrel employed in a camera.

A photographing lens having a zooming or focusing function is employed in a certain type of camera. In the photographing lens, the pin provided on the frame of each lens element is guided along the cam groove formed in a cam cylinder, and the positional relationships among the lens elements are determined by utilization of the cam groove. In order to perform zooming or focusing in an optimal manner and to produce a high-quality image, the positional relationships among the lens elements are ensured beforehand in relation to the cam groove. The cam cylinder is driven for zooming or focusing, by manually rotating the control ring mechanically associated with the cam cylinder or by means of a motor mechanically associated with the cam cylinder.

In U.S. Pat. No. 4,161,756, an actuator is provided for each one of lens groups, and the lens groups are driven independently of one another.

With the recent remarkable progress in the electronic technology, it has become possible to drive the lenses of a camera with high accuracy by mean of actuators of various types. Further, it has become possible to automatically control the driving of the lenses in accordance with the outputs of both an auto focus sensor and an electronic manual-operation dial. As a result of these, the driving time of the lenses has been shortened, and the control of the driving of the lenses has been made easier to perform.

At the same time, however, the load which is applied to the battery (i.e., a D.C. power supply) incorporated in the camera or provided for the photographing lens has been increased. In particular, the actuators consume a large amount of power. Moreover, since a number of lens groups are driven at one time, with the cam cylinder rotated, a large amount of power is required at one time, thus shortening the life of the battery. This problem may be solved by slowly driving the actuators, but this way for solving the problem inevitably results in a long driving time.

To solve the above problem, one lens group may be driven by its own high-speed actuator such that the driving timing of that lens group is shifted from that of another. In this case, however, it is likely that the lens groups will dynamically interfere with one another, if their positional ranges overlap with one another. In the case of e.g. a TTL camera, the positional relationships among the lens groups may deviate greatly from the positional relationships intended at the time of design, if the lens groups are driven for a long distance. In the worst case, the lens groups may collide with one another. If this happens, the image observed through the viewfinder is greatly affected. As a result, the operator looking into the viewfinder may feel unpleasant, and think it difficult to accurately operate the operation members while looking into the viewfinder.

The lens barrel of a camera contains a plurality of lens groups. Conventionally, a cam groove along which the lens groups are moved is formed in a single cylinder, and the lens groups are driven, with their predetermined positional relationships maintained, by rotating or linearly moving the single cylinder. However, since it is not easy to form a cam groove having such a complicated shape as corresponds to desirable movement of the lens groups, the manufacturing cost is inevitably increased. In an effort to provide a solution to this problem, U.S. Pat. No. 4,161,756 referred to above discloses a lens barrel having no cam groove. According to this U.S. patent, the positional relationships among a plurality of lens groups are stored in a storage means (such as a ROM) as digital-value data. On the basis of the digital-value data and the positional information obtained by actual measurement, the lens groups are driven independently of one another.

According to the above U.S. patent, the lens groups contained in the lens barrel attain intended positional relationships after they have been moved to their respective positions. However, they do not necessarily maintain desirable positional relationships during their movement. Therefore, in the case where focus detection is performed by using the light which represents the image of a subject and coming through the photographing lens, the lens groups have to attain the intended positional relationships, before starting the focus detection.

SUMMARY OF THE INVENTION

It is, therefore, an object of the present invention to provide a new and improved optical lens system-driving control apparatus for microscopically driving a plurality of lens groups in a smooth and reliable manner, without causing collision between the lens groups.

According to one aspect of the present invention, there is provided an optical lens system-driving control apparatus which comprises:

a plurality of lens groups movably provided along in the direction of an optical axis therebetween;

a plurality of motors provided in order to drive the plurality of lens groups, respectively;

single driving circuit means for the selectively driving the plurality of motors by applying power to at least two of the plurality of motors;

switching means, arranged between the plurality of motors and the single driving circuit means, for sequentially selecting one of the plurality of motors and electrically connecting a selected motor to the single driving circuit means;

a plurality of lens position-detecting means provided in order to detect positions of the plurality of lens groups, respectively;

final target position data-generating means for outputting final target position data which represents a final target position corresponding to each of the plurality of lens groups;

intermediate target position data-generating means for outputting intermediate target position data which represents an intermediate target position of each of the plurality of lens groups, the intermediate target position being intermediate between a present position and the final target position and microscopically separated from the present portion; and driving control means for sequentially and microscopically driving and controlling the plurality of lens groups to the final target position, respectively, via the switching means and the single driving circuit means, the driving control means having means for sequentially driving the plurality of lens group to the intermediate target position in accordance with the intermediate target position data output by the intermediate target position data-generating means, respectively, then demanding next intermediate target position data corresponding to a next intermediate position which is slightly away from the intermediate target position when the lens position-detecting means detects that the plurality of lens groups have reached the intermediate target position, respectively, then sequentially driving the plurality of lens groups to the next intermediate target position in accordance with the next intermediate target position data, respectively, and then repeating similar control until the plurality of lens groups are moved to the final target position, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A–1C through FIG. 10 illustrate the first embodiment of the present invention, in which:

FIG. 1A is a block circuit diagram showing an electric circuit;

FIGS. 1B and 1C are detailed views of the encoder shown in FIG. 1A;

FIG. 10 is a graph showing the characteristics of a current used for driving the lens groups;

FIGS. 11A and 11B form a flowchart showing a power focusing operation which is performed according to the second embodiment of the present invention;

FIGS. 12 through 21 illustrate the third embodiment of the present invention, in which;

FIG. 12 is a sectional view of a zoom lens and illustrate the structures of lenses and lens frames;

FIG. 13 is a schematic perspective view of a camera to which the zoom lens is attached;

FIG. 14 shows how each group is positioned with reference to the focusing distance;

FIG. 15 is a block circuit diagram of the electric circuit employed in the third embodiment;

FIGS. 16A and 16B form a flowchart showing the procedures for performing a zooming operation;

FIG. 17 is a graph showing the distance for which each lens group is moved with reference to a zooming state;

FIG. 18 is a graph showing how a focus adjustment is made with reference to the zooming state;

FIGS. 19A and 19B form a flowchart showing the procedures for manual performing a power focusing operation;

FIG. 20 is a graph showing how a focusing adjustment is made with reference to a focusing state;

FIG. 22 shows in detail a driving circuit and a switching circuit which are employed in the fourth embodiment of the present invention;

FIG. 32 shows digital values of the distance information which represents the positional relationships among the lens groups and which is stored in the storage section (a ROM) of the sixth embodiment in the form of a table.

DETAILED DESCRIPTION OF THE PREFERRED EMBODIMENTS

Figure 1B:
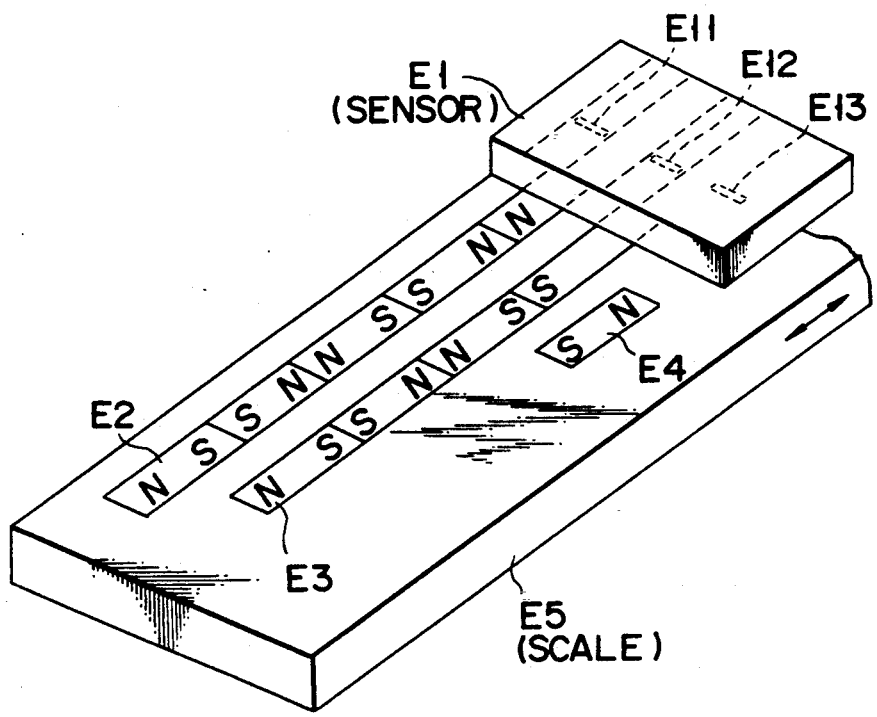

Reference will now be made in detail to the presently preferred embodiments of the invention as illustrated in the accompanying drawings, in which like reference characters designate like or corresponding parts throughout the several drawings.

The first embodiment will be described, referring to a camera incorporating a single-focus lens system which is made up of four lens groups and which is focused by use of two of the four lens groups.

Figure 2:
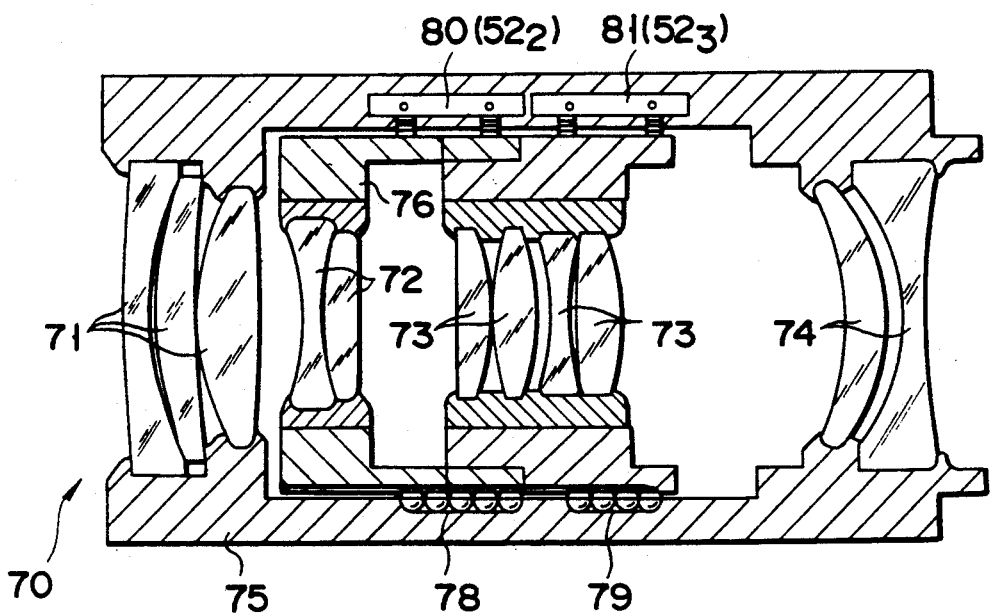
FIG. 2 is a sectional view of a zoom lens and illustrates, in particular, the structures of lenses and lens frames.

FIG. 2 show the lens assembly and lens frame structure which are employed in the single-focus lens system 70. Referring to FIG. 2, a first lens group 71 and a fourth lens group 74 are secured to a fixing frame 75. At the time of focusing, a second lens group 72 and a third lens group 73 are driven from the position corresponding to the infinity toward the position corresponding to the minimum focusing distance by the distance indicated in FIG. 6. A second-group frame 76 and a third-group frame 77, which hold the second and third lens group 72 and 73, respectively, can be guided by bearings 78 and 79 arranged on the inner wall of the fixing frame 75, such that the second-group and third-group frames 76 and 77 ar movable inside the fixing frame 75 in the direction of the optical axis only. In addition, the second-group frame 76 and the third-group frame 77 are pressed against the bearings 78 and 79 by the bearings 78 and 79 by vibrating members 80 and 81 which are arranged on the fixing frame 75 to be symmetric with reference to the optical axes of the supporting members. Due to the use of the bearings 78, 79 and the vibrating members 80, 81, the second-group frame 76 and the third-group frame 77 are positioned with reference to the fixing frame 75 and are prevented from being shifted in the direction of the optical axis and in the direction perpendicular to the optical axis.

A detailed description will be given of the structure for securely holding the vibrating members 80 and 81 and the operation of the linear ultrasonic motors employed for the respective vibrating members 80 and 81. In the first embodiment, two linear ultrasonic motors (which are indicated by reference numerals $52_2$ and $52_3$ in FIG. 1) ar employed such that they correspond to the second-group and third-group frames 76 and 77, respectively. Since the two linear ultrasonic motors $52_2$ and $52_3$ are arranged in manners similar to each other and have structures similar to each other, they will be explained, with the linear ultrasonic motor $52_2$ employed for the second-group frame 76 being taken by way of example.

Figure 4A:
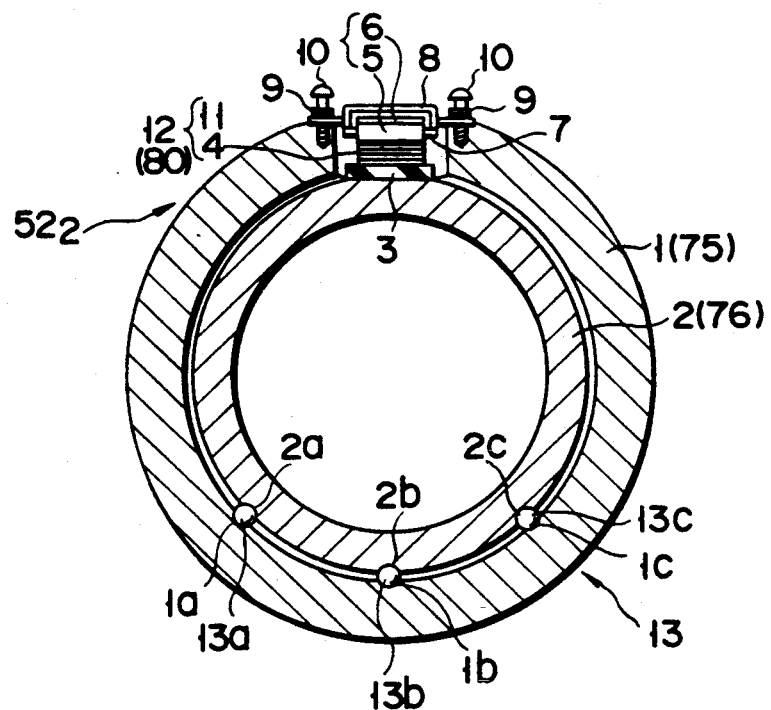
FIGS. 4A, 4B and 5 are views showing the detailed structure of a linear ultrasonic motor.
Figure 4B:
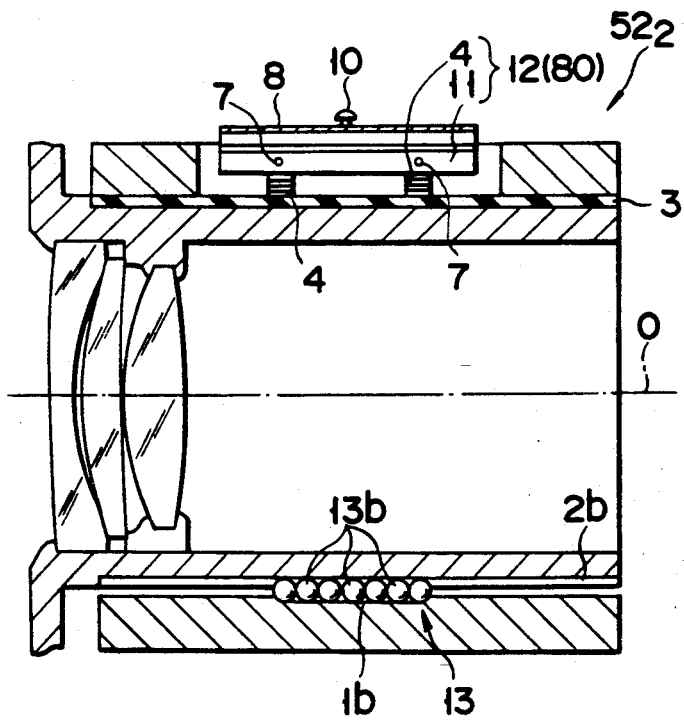
Figure 5:
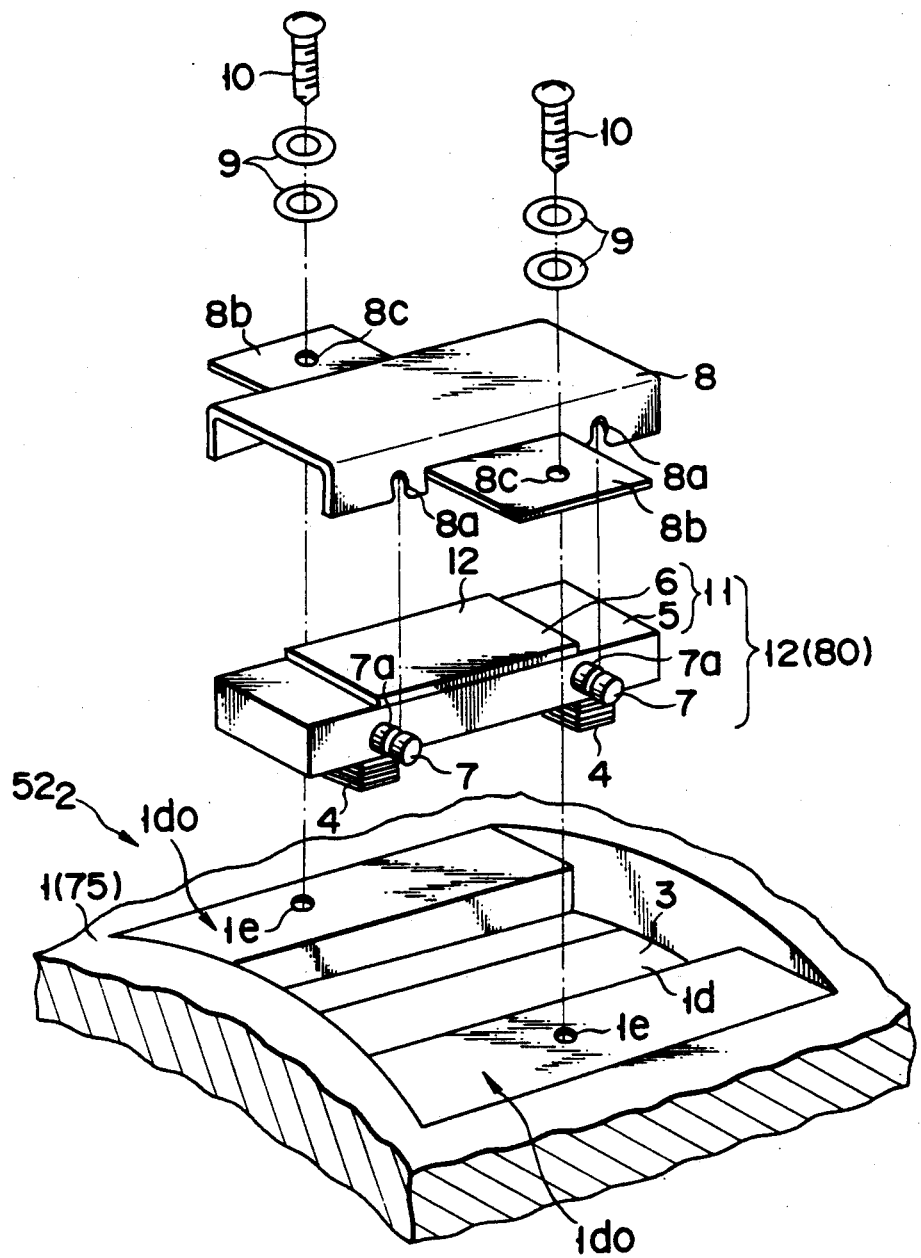

The linear ultrasonic motor is illustrated in FIGS. 4A, and 4B and FIG. 5. Referring to these figures, the fixing frame 1 (75) is a hollow cylindrical stationary member, and the second-group frame 2 (76) is a hollow cylindrical movable member. The second-group frame 2 is arranged in the fixing frame 1, with a certain gap maintained therewith, and is movable in the direction of the central axis O. In that region of the gap which is depicted as being upper FIGS. 4A and 4B, a slide plate 3 is arranged. This slide plate 3 is fixed to the second-group frame 2 and extending in parallel to the central axis O. As is best shown in FIG. 5, a cutout section 1d having a rectangular-parallelpipedic shape is formed in the fixing frame 1 such that it is located at the longitudinal middle position of the fixing frame 1 and corresponds in position to the slide plate 3. The cutout section 1d is elongated in parallel to the central axis. As will be detailed later, the vibrating member 12 (80 is arranged within the cutout section 1d.

A mechanism 13 for supporting/guiding the second-group frame 2 is located in that region of the gap which is opposite to the slide plate 7. In the first embodiment, the support/guide mechanism 13 is obtained by forming three guide regions (1a, 2a; 1b, 2b; 1c, 2c) and arranging a plurality of support members (i.e., bearing balls 13a, 13b and 13c) in each of the guide regions. More specifically, a linear groove 2b having a semicircular cross section is formed in the outer circumferential portion of the second-group frame 2, such that the linear groove 2b is located opposite to the slide plate 7 and extends in parallel to the central axis O. A linear groove 1b having a semicircular cross section is formed in the inner circumferential portion of the fixing frame 1, such that the linear groove 1b is located at the longitudinal middle position of the fixing frame 1 and corresponds in position to linear groove 2b. Linear grooves 2a and 2c, each having a semicircular cross section, are formed in the outer circumferential portion of the second-group frame 2, such that linear grooves 2a and 2c are located away from linear groove 2b by the same circumferential distance and extend in parallel to the central axis O. Likewise, linear grooves 1a and 1c, each having a semicircular cross section, are formed in the inner circumferential portion of the fixing frame 1, such that linear grooves 1a and 1c are located away from linear groove 1b by the same circumferential distance and extend in parallel to the central axis O. Support members 13a are arranged in the guide region defined by grooves 1a and 2a, support members 13b are arranged in the guide region defined by grooves 1b and 2b, and support members 13c are arranged in the guide region defined by grooves 1c and 2c.

When the vibrating member 12, which is located opposite to support members 13b, pushes the slide plate toward the central axis O, a centripetal force is produced by support members 13a–13c arranged in the guide regions and is applied to the second-group frame 2. Since, therefore, the central axis of the second-group frame 2 is aligned with that of the fixing frame 1, the members associated with the second-group frame 2 are positioned with precision. In addition, since support members 13a–13c are arranged in parallel to the central axis O of the fixing frame 1, the central axis of the second-guide frame 2 is prevented from being shifted from that of the fixing frame 1. It should be also noted that the second-group frame 2 is supported by use of support members 13a–13c alone. Therefore, the second-group frame 2 can be accurately positioned with reference to the fixing frame 1 by working linear grooves 1a–1c and 2a–2c with precision.

As is shown in FIGS. 4A and 4B, the cutout section 1d is located at the longitudinal middle portion of the upper portion of the fixing frame 1 and corresponds in position to the slide plate 3. To form the cutout section 1d, the upper portion of the fixing frame 1 is partially cut out at the longitudinal middle position thereof in such a manner as to form a flat-surface portion. The surface of this portion is flat and parallel to the central axis O. Then, a through hole having an axially-elongated rectangular-parallelpipedic shape is formed in the central of the flat-surface portion, thereby obtaining the cutout section 1d. Since the cutout section 1d is obtained in this manner, flat surfaces 1do are located on the sides of the cutout section 1d. To these flat surfaces 1do, a holder 8 for supporting the vibrating member 8 is attached.

The vibrating member 12 is comprised of a bendable vibration element 11 and a longitudinal-vibration element 4. The bendable vibration element 11 is made up of: a rectangular, comparatively-thick elastic member 5 which has such a size as to leave a certain space inside the cutout section when installed therein; and a piezoelectric element 6 which is shorter and thinner than the elastic member 5 and which is bonded to the upper surface of the elastic member 5 by use of an epoxy adhesive. A high-frequency driving voltage is applied between the two sides of the piezoelectric element 6 of the bendable vibration element 11. As a result of the application of this driving voltage, primary bending resonance is produced in the case of the first embodiment. The longitudinal-vibration element 4 is of a laminated structure made up of rectangular piezoelectric plates. It is attached to the lower side of the elastic member 5 (i.e., to that side of the elastic member 5 on which the piezoelectric element 6 is not provided), such that it vibrates longitudinally (i.e., in the thick direction of the laminated structure) at two of the nodes of the bending vibration.

In the bendable vibrating element 11, four cylindrical support pins extending outwardly in the widthwise direction of element 11 are fixed to the elastic member 5. An annular groove 7a, which is engageable with the holder 8, is formed in the longitudinal center of each support pin 7.

The holder 8 has a U-shaped cross section, and the vibrating member 12 is fitted and held inside the holder 8. More specifically, the holder 8 is obtained by bending an elastic thin plate in such a manner as to form two side walls. Semicircular cutout sections 8a are formed from the edges of the side walls, such that the cutout sections 8a correspond in position to the support pins 7 and are engageable with the annular grooves 7a of the support pins 7. The diameter of the semicircular cutout sections 8a is slightly shorter than the diameter of that portion of the support pin 7 where the annular grooves 7a are formed. The holder 8 is provided with a fixing portion 8b which is projected outwardly from each side wall in the horizontal direction. The fixing portion 8b has openings 8c through which fixing screws 10 are inserted.

The vibrating member 12 is arranged within the holder 8 in such a manner as to freely vibrate inside the holder 8, by loosely fitting the annular grooves 7a of the support pins 7 in the semicircular cutout sections 8a, and can be vibrate inside the holder 8. Thereafter, the fixing screws 10 are inserted into the respective openings 8c of the holder 8, with conical spring washers 9 interposed, and are then threadably inserted into the screw holes 1e formed in the flat surfaces 1do of the fixing frame 1. In this manner, the vibrating member 12 is arranged inside the cutout section 1d. In the vibrating member 12 thus arranged, the lower surface of the longitudinal-vibration element 4 is pressed against the upper flat surface of the slide plate 3 which is fixed to the second-group frame 2.

The operating principle of the ultrasonic motor of the above structure is detailed in U.S. patent application Ser. No. 558,826 (title: "Ultrasonic Motor"), filed by Hiroyuki TAKIZAWA et al. on Jul. 26, 1990 and assigned to Olympus Optical Co., Ltd. The descriptions in this U.S. Patent Application are incorporated herein as a reference.

The operating principle of the ultrasonic motor will be described briefly.

Where the phase difference between the bending vibration and the longitudinal vibration is set to be 90°, elliptical vibration, which causes the second-group frame 2 to reciprocate in the direction of the central axis O, is produced in the end faces of each longitudinal-vibration element 4. Since the two longitudinal-vibration elements 4 of the first embodiment are designed to vibrate with a vibration phase of 180°, only the one-direction motion of the pendulum vibration produced at the nodes of the bending vibration is transmitted to the slide plate 3 of the second-group frame 2. As a result, the second-group frame 2 is reciprocated in the direction of the central axis O.

The electric circuit employed in the first embodiment will now be described, with reference to FIG. 1A. Referring to FIG. 1A, reference numeral $52_2$ and $52_3$ denote linear ultrasonic motors provided for the vibrating members 80 and 81 shown in FIG. 2, respectively, and reference numeral $51_2$ and $51_3$ are encoders which are driven by motors $52_2$ and $52_3$ and detect the movement of the second-group frame 76 and third-group frame 77, respectively. Each of the encoders $51_2$ and $51_3$ is made up of a scale and a reader (i.e., a sensor). On the scale, two graduation lines are formed, with their graduations being shifted in phase at equal intervals. On the scale, one graduation line is also formed, so as to indicate the terminating position serving as a reference position. The scale is provided for the fixing frame 1, and the reader is provided for both the second-group frame 76 and the third-group frame 77. When the reader moves with reference to the scale, it generates and outputs a pulse at the position corresponding to each graduation.

The encoders $51_2$ and $51_3$ will be described in more detail, with reference to FIGS. B and C, referring to the case where a known MR encoder is employed.

As is shown in FIG. 1B, each encoder is made up of: a scale E5 on which two graduation lines E2 and E3 are formed, with their graduations being shifted in phase at equal intervals; and a sensor E1 which has two reading portions E11 and E12 for reading the two graduation lines E2 and E3, respectively. Another graduation line E4 is also formed on the scale E5, so as to indicate the terminating position serving as a reference position, and a reading portion E13 for reading this graduation line E4 is provided for the sensor E1. Each of the reader portions E11-E13 is made by a magnetoelectric converting element, and each of the graduations is a magnetic graduation. The resistance of the magnetoelectric converting element of each reading portion varies in accordance with the direction in which magnetic fluxes in the neighborhood of the reading portion extend. An output is obtained on the basis of the detection of the resistance of the magnetoelectric converting element.

Figure 1C:
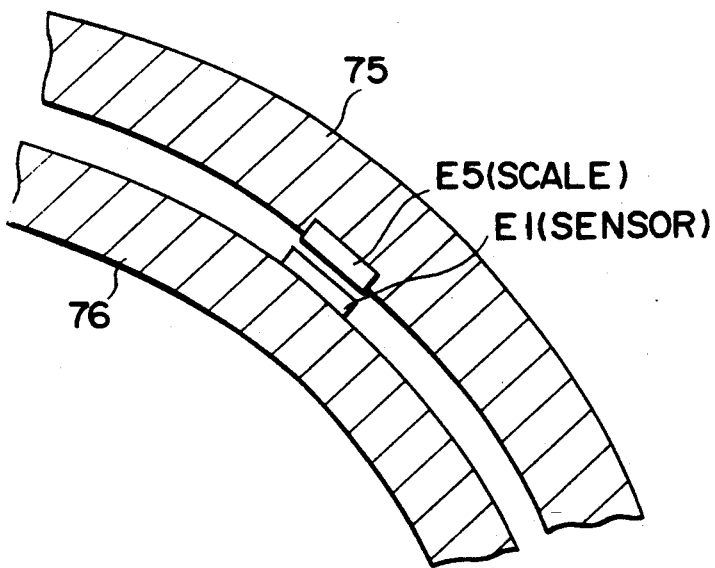

FIG. 1C is a sectional view showing the positional relationships between the sensor E1 and the scale E5. As mentioned above, the scale E5 is provided for the fixing frame 75 (1), and the sensor E1 is provided for both the second-group frame 76 and the third-group frame 77. The longitudinal axes of the sensor E1 and each scale E5 are set in parallel to the optical axis. When the sensor E1 moves with reference to the scale E5, it generates and outputs a pulse at the position corresponding to each graduation.

Turning back to FIG. 1A, reference numerals $53_2$ and $53_3$ denote direction-detecting circuits. These direction-detecting circuits $53_2$ and $53_3$ detect the moving directions on the basis of the information regarding the phase difference between the pulses generated by the encoders $51_2$ and $51_3$. Reference numerals $55_2$ and $55_3$ denote up/down counters for counting the number of encoder pulses which are generated from the time when the sensor E1 is at the terminating position. Reference numeral 54 denotes a driving circuit for driving the ultrasonic motors $52_2$ and $52_3$ (which are constituted by vibrating members 80 and 81, respectively), on the basis of a driving control signal supplied from an operation control section 57 (i.e., a CPU). Reference numeral 59 denotes a switching circuit which selects either ultrasonic motor $52_2$ or ultrasonic motor $52_3$ and allows the pulses generated by the driving circuit 54 to be supplied to the selected ultrasonic motor.

Figure 7:
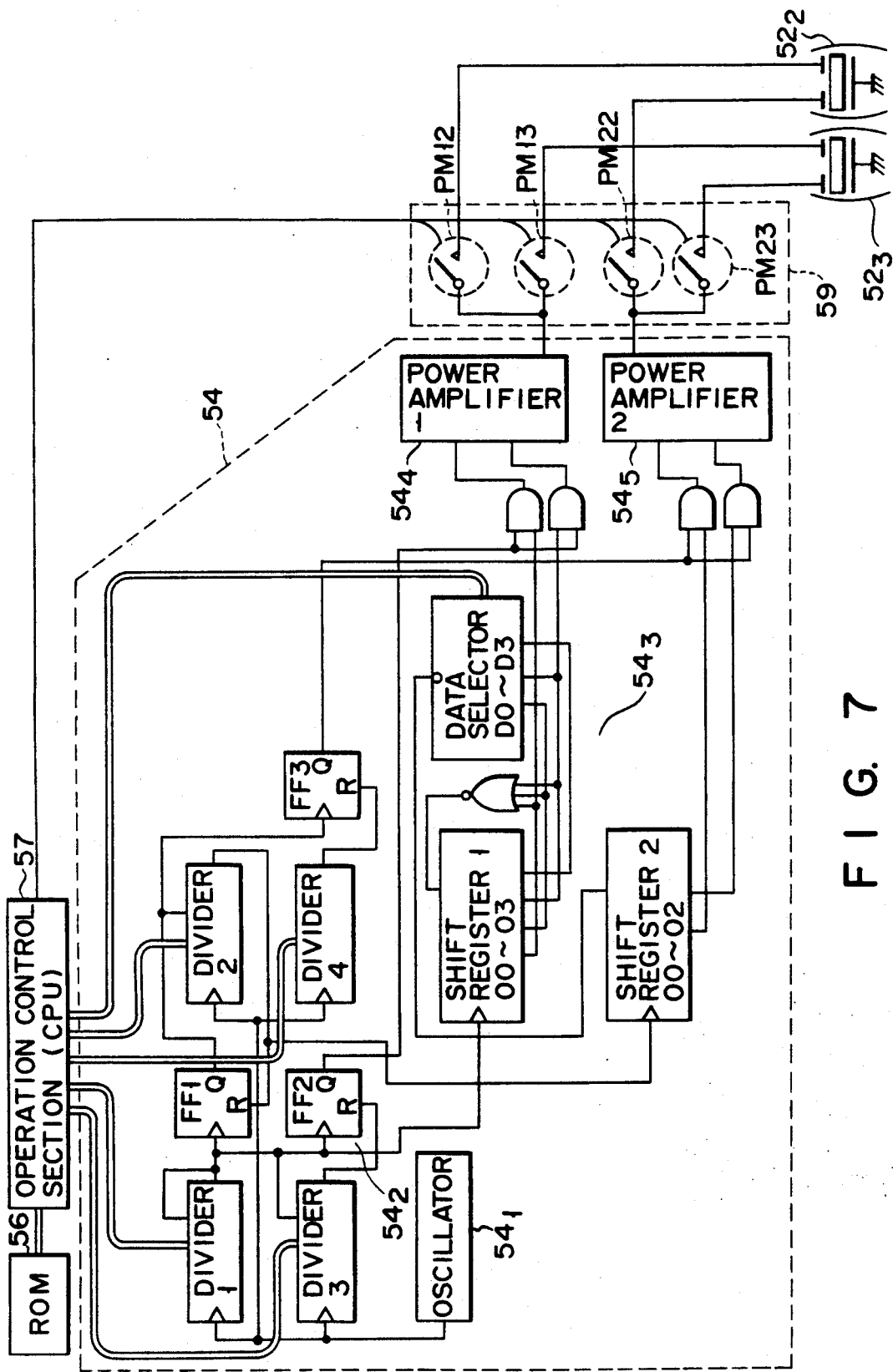
FIG. 7 shows a driving circuit and a switching circuit in detail.

The driving circuit 54 and the switching circuit 59 are shown in detail in FIG. 7. Since the operation of the driving circuit 54 is detailed in U.S. patent application Ser. No. 512,983 (title: "Circuit for Driving Ultrasonic Motor"), filed by Toyoji SASAKI on Apr. 23, 1990 and assigned to Olympus Optical Co., Ltd., the descriptions in this U.S. Patent Application are incorporated herein as a reference.

The driving 54 circuit shown in FIG. 7 will be described briefly. Basically, the driving circuit 54 is made up of: a quarts oscillator S41 for producing a reference signal having a frequency of e.g. 24 MHz; a frequency-dividing section 542 for dividing the frequency of the reference signal to obtain a 40 KHz signal in accordance with the present values (e.g., frequency and phase data) which are read out of the ROM 56 by the CPU 57; a ring counter section 543 for converting the output of the frequency-dividing section 542 into a predetermined pulse signal; and first and second power amplifiers 544 and 555 which are supplied with the output of the ring counter section 543. The first and second power amplifiers 544 and 545 produce two-phase ultrasonic outputs which are 90° out of phase and have variable pulse widths. Under the control of the CPU 57, the two-phase ultrasonic outputs are applied to either ultrasonic motor $52_2$ or ultrasonic motor $52_3$ by way of the switching circuit 59. The switching circuit 59 is a combination of e.g. photo MOS relays PM12, PM13, PM22 and PM23, such as those shown in FIG. 7. These relays are opened or closed in response to control signals supplied from the operation control section 57.

Turning back to FIG. 1A, reference numeral 56 denotes a ROM. This ROM 56 stores a program which is necessary for the operation control section 57 to execute operation control. The ROM 56 also stores data of various kinds. Reference numeral 58 denotes an AF (auto focus) module of a TTL phase difference detection type. Reference numeral $60_1$ denotes a focusing operation-input section used at the time of manual focusing. Reference numeral $60_2$ denotes an AF/PF switch for switching between the AF (auto focus) mode and the PF (power focus) mode. As is understood from FIG. 1A, signals output from the up/down counters $55_2$ and $55_3$, the AF module 58, the focusing operation-input section $60_1$ and the AF/PF switch $60_2$ are supplied to the operation control section 57 at predetermined timings. On the basis of these signals, the operation control section 57 generates a driving control signal and supplies it to the driving circuit 54, so as to drive the ultrasonic motors $52_2$ and $52_3$.

Figure 3:
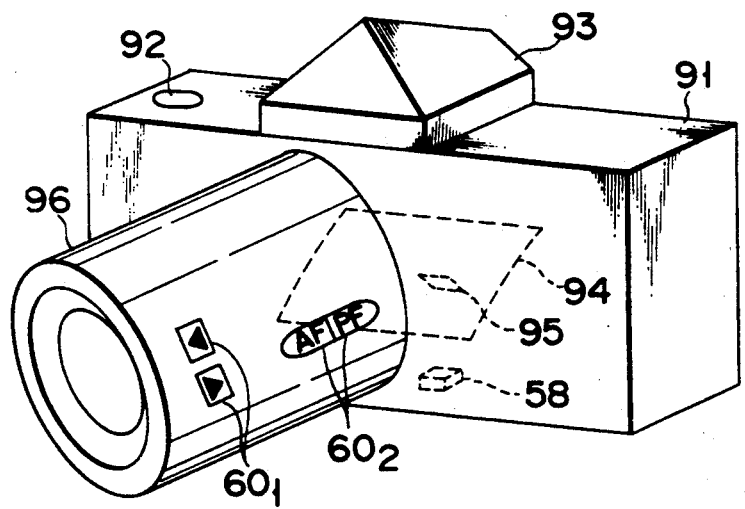
FIG. 3 is a schematic perspective view showing how the zoom lens is attached to a camera.

FIG. 3 is a schematic perspective view showing a zoom lens and a camera both of which are employed in the first embodiment.

As is shown in FIG. 3, the body 91 of the camera is provided with: a release button 92 capable of outputting a signal corresponding to a half-depressed state (i.e., a first release state) and a signal corresponding to a fully-depressed state (i.e., a second release state); a viewfinder 93 which employs a pentaprism used for determining the angle of view; a quick-return type main mirror 94 for guiding light to the viewfinder 93; a sub mirror 95, attached to the center of the main mirror 94, for guiding light to an AF module 58 contained in the bottom of the body 91; and the above-mentioned AF module 58. On the other hand, the zoom lens 96 is provided with the focusing operation-input section $60_1$ and AF/PF switch $60_2$ mentioned above. The focusing operation-input section $60_1$ is operated at the time of manual focusing (power focusing) and is capable of outputting the signals respectively corresponding to the half-depressed state and fully-depressed state.

A description will now be given of the power focusing of the camera of the first embodiment, with reference to the flowchart shown in FIG. 1. First, a button of the focusing operation-input section $60_1$ is operated. In response to this operation, the camera is set in the power focusing mode. In this mode, the CPU 57 (i.e. the operation control section) reads the initial-position data of the second-group lens 72 on the basis of the output of the counter $55_2$ (step F1). In steps F2 to F8, thereafter, the CPU 57 determines whether the operated button is a retreating button or an advancing button, and whether the operated button is in the half-depressed state corresponding to a slow-operation mode or in the fully-depressed state corresponding to a fast-operation mode. On the basis of this determination, the CPU 57 outputs direction and moving-distance data pertaining to the second-group lens 72. In order not greatly vary an image, the moving-distance data is $\delta$ in the slow-operation mode and is $3 \cdot \delta$ in the high-operation mode. Next, in step F9, the CPU 57 outputs target position data (step F9) by adding the moving-distance data to the initial-position data read in step F1. Further, in step F10, the CPU 57 produces that position data of the third-group lens 73 which corresponds to the target position data of the second-group lens 72, by using the formula mentioned later. In the method described up to this point, the position data on the second-group lens 72 and that on the third-group lens 73 are produced.

In step F11, the CPU 57 turns on photo MOS relays PM12 and PM22. In addition, the CPU 57 actuates the driving circuit 54 in step F12, to thereby cause the ultrasonic motor $52_2$ to start the driving of the second-group lens 72. Thereafter, in step F13, the CPU 57 determines whether or not the second-group lens 72 has been driven to the target position by repeatedly reading out the position data on the second-group lens 72. When the second-group lens 72 has been driven to the target position, the CPU 57 stops the supply of driving signals in step F14, to thereby stop the driving of the second-group lens 72. After the driving of the second-group lens 72 is stopped, the CPU 57 turns off photo MOS relays PM 12 and PM 22 in step F15, thus bringing the first-time driving of the second-group lens 72 to an end.

The CPU 57 drives the third-group lens 73 in steps F16 to F20 in the same manner as the second-group lens 72. After the driving of the third-group lens 73, the CPU 57 determines, in step F21, whether or not the focusing operation has been completed. If the focusing operation is still being performed, the flow returns to step F2. If, on the other hand, the focusing operation has been completed, then the power focusing mode is brought to an end.

Figure 9:
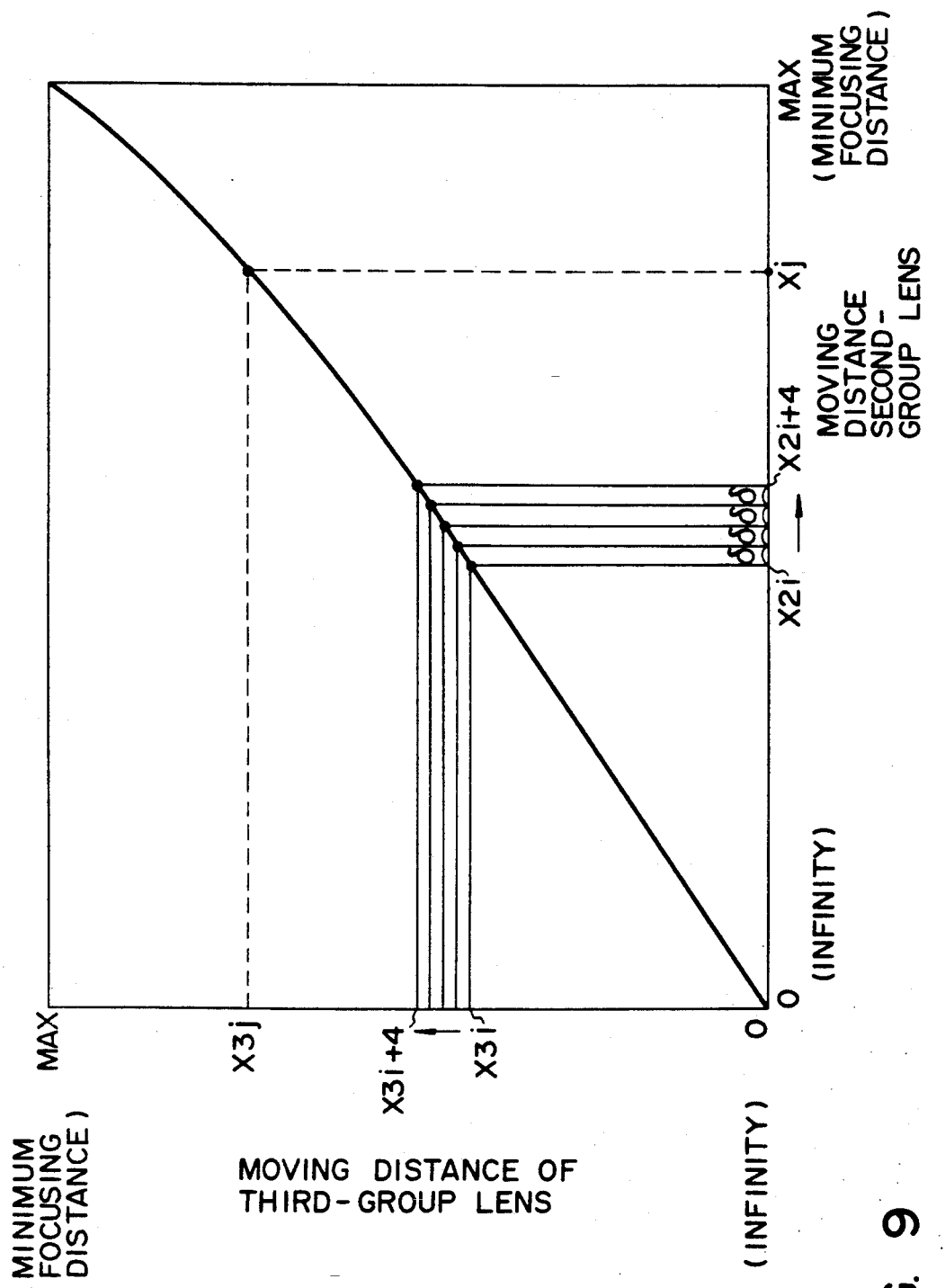
FIG. 9 is a graph showing how the third lens is moved in relation to the moving distance of the second lens.

A description will now be given as to how the target position data on the third-group lens 73 is obtained in accordance with the target position data on the second-group lens 72. In the first embodiment, the target position data on the third-group lens 73 is obtained by approximation, using the predetermined formula. In the graph shown in FIG. 9, the relationship between the moving distance of the second-group lens 72 and that of the third-group lens 73 is represented by a curved line. Since this curved line can be regarded as a combination of line segments connected together, data regarding coefficients a and b corresponding to the position data on the second-group lens is stored in a memory beforehand. Accordingly, the target position data X3i on the third-group lens 73 can be calculated by the following formula:

$$X3i = aX2i + b$$

where x2i is target position data on the second-group lens 72.

By use of the above technique, the target position data on the third-group lens 73 can be easily obtained with such accuracy as is practically satisfactory.

A description will be given as to how the second-group lens 72 and the third-group lens 73 are driven in the slow-operation mode, with reference to the graph shown in FIG. 6. After the second-group lens 72 is moved by $\delta$ from point FP2i to point FP2i+1, the third-group lens 73 is moved from point FP3i to point FP3i+1. After the second-group lens 72 is moved next from point FP2i+1 to point FP2i+2, the third-group lens 73 is moved from point FP3i+1 to point FP3i+2. In this manner, each time the second-group lens 72 is moved for the predetermined distance, the third-group lens 73 is moved to the position corresponding to the point to which the second-group lens 72 has been moved. This operation is repeated until the second-group lens 72 and the third-group lens 73 are moved to points FP2j and FP3j, respectively.

Figure 10:
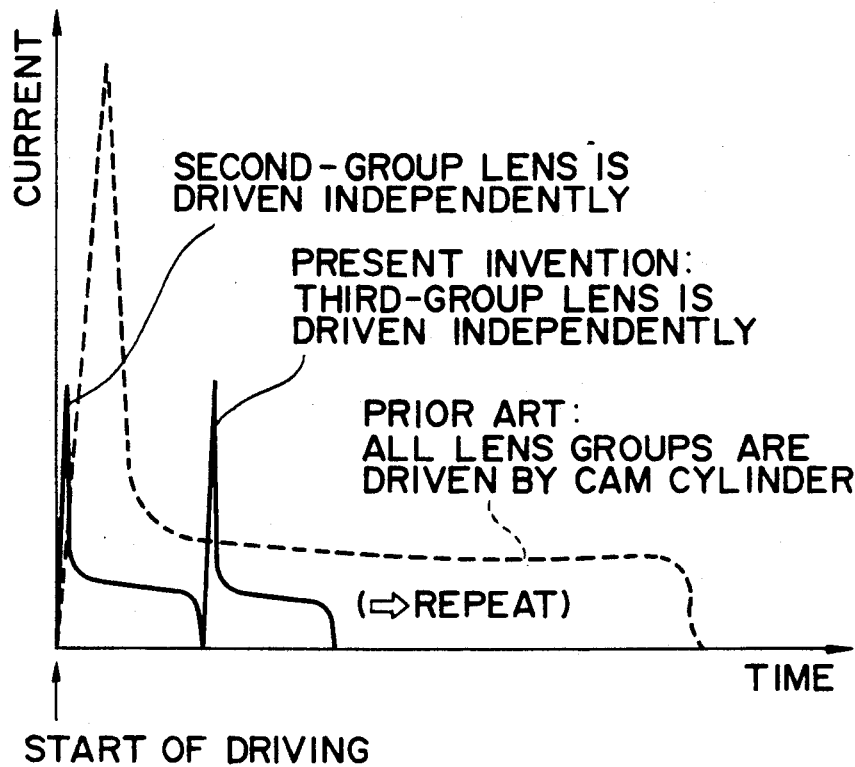

FIG. 10 shows the waveform of a current with which to drive the second-group lens 72 and the third-group lens 73. In FIG. 10, the solid line represents the case where the lenses 72 and 73 are driven according to the first embodiment, and the broken line represents the case where the lenses 72 and 73 are driven by employing the conventional cam cylinder. In the case of the first embodiment (the solid line), the mechanical power loss is small and the load arising from the mass of a cam cylinder is light, in comparison with the case where the cam cylinder is employed. In addition, since the lenses are driven on a time-divisional basis, the peak of the current at the time of acceleration is at a very low level, in comparison with the case where the lenses are not driven on the time-divisional basis. Accordingly, the flow of a large amount of current, which may cause damage to a battery (i.e., a power source), can be suppressed, thus lightening the load applied to the battery.

In the first embodiment, moreover, the linear ultrasonic motors can be driven by a single driving circuit, with the result that the electric circuit can be compact in size. In the first embodiment, the lens groups are driven independently, but a dynamic interference or collision among them is prevented even if their moving-distance ranges partially overlap with one another. Further, since the image observed through the viewfinder is not blurred, the operator looking into the viewfinder does not feel unpleasant. Thus, the technique of driving the lens groups on a time-divisional basis can be utilized in the power focusing or zooming system of a TTL camera.

In the first embodiment, an AF operation is performed in a similar manner to that of the power focusing operation mentioned above. That is, the distance for which a given lens group is moved is detected, and another lens group is moved on a time-divisional basis in accordance with the detection. Needless to say, the advantages mentioned above are obtained in the case of this AF operation as well.

Next, the second embodiment of the present invention will be described. The structure of the second embodiment is substantially similar to that of the first embodiment, except for some points to be mentioned below.

In the first embodiment, the first-group lens 72 is moved for a predetermined distance, and the desirable position of the third-group lens 73 is calculated in accordance with the position to which the second-group lens 72 has been moved. With this operation repeated, the second-group and third-group lenses 72 and 73 are driven alternately. In the second embodiment, in contrast, the position of the second-group lens 72 and the corresponding position of the third-group lens 73 are determined beforehand in relation to many focusing conditions, and their data is stored in a ROM 56. For power focusing, the second-group and third-group lenses 72 and 73 are driven, with their positions in the adjacent focusing conditions being referred to.

Figure 6:
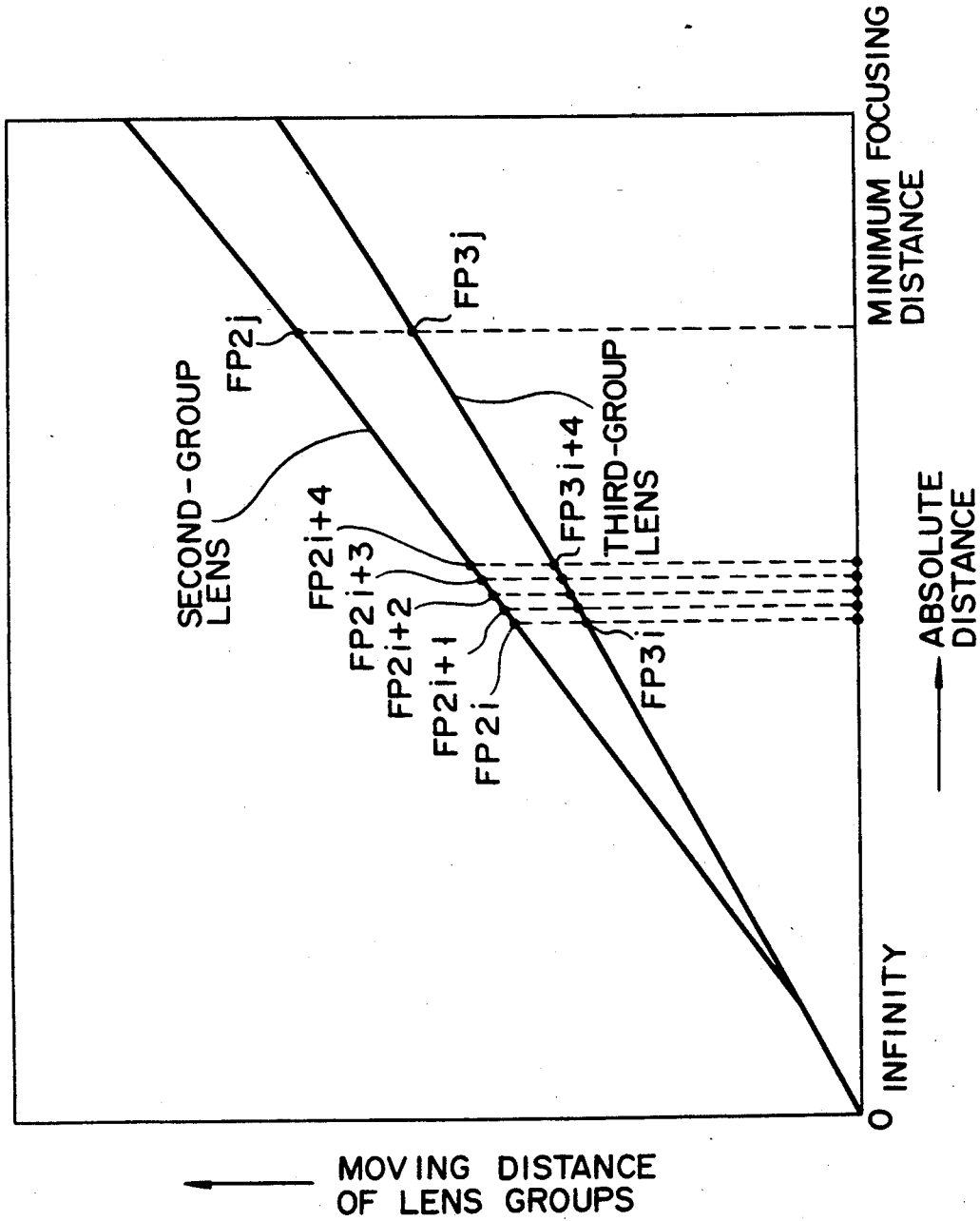
FIG. 6 is a graph showing the relationships between the driving distance of lens groups and the focusing distance expressed with the infinity as a reference position.
Figure 8A:
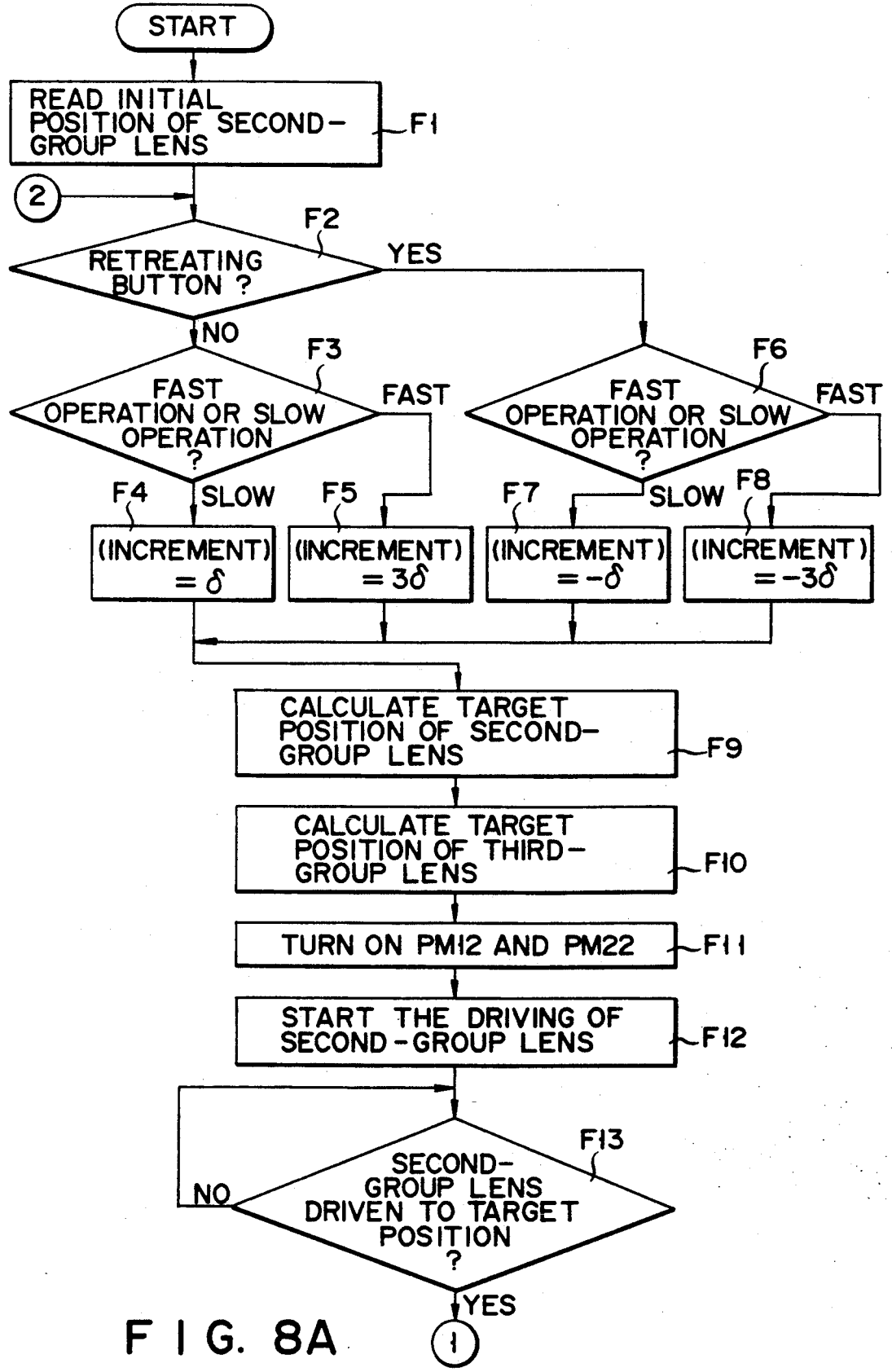
FIGS. 8A and 8B form a flowchart showing a power focusing operation.
Figure 8B:
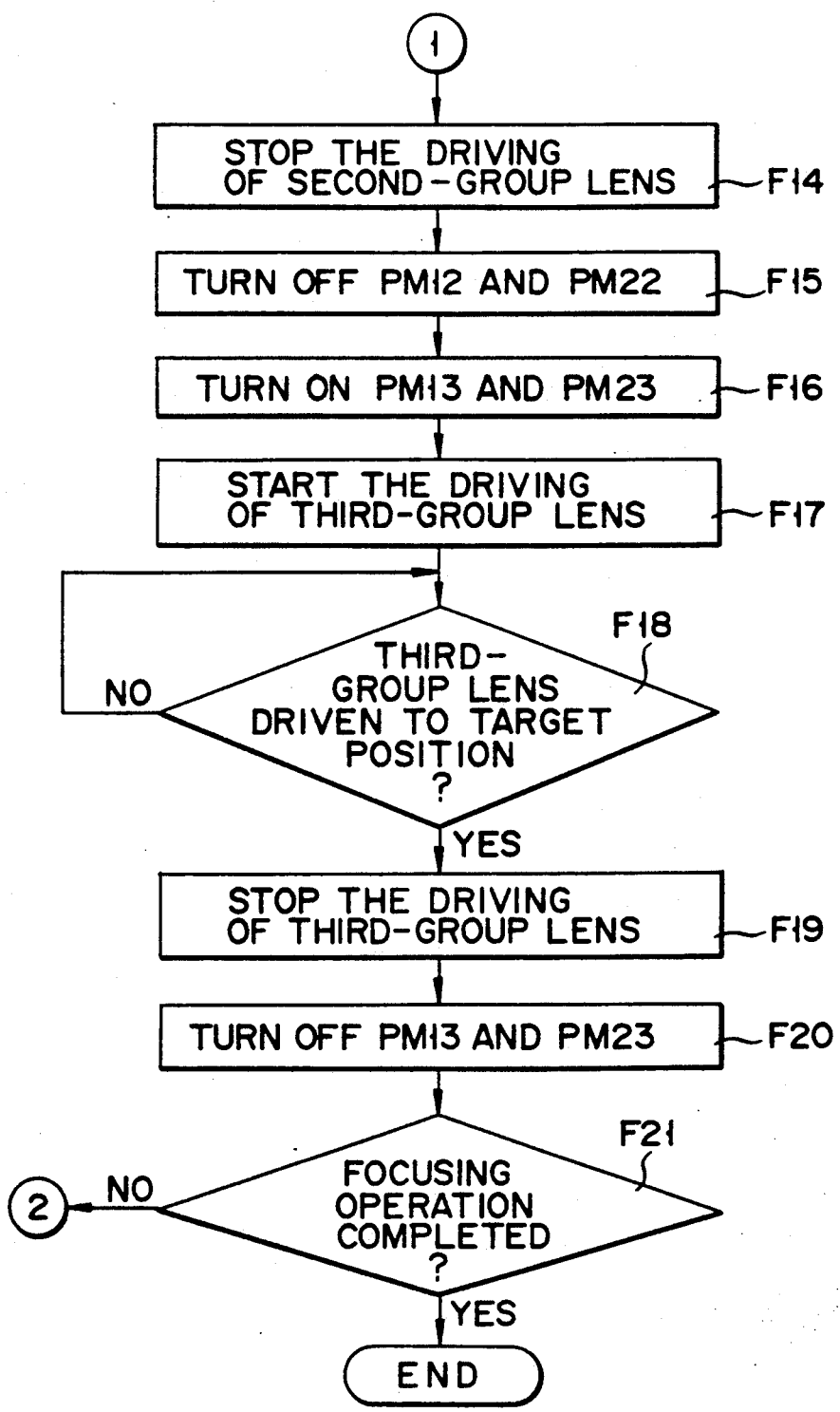

More specifically, in the second embodiment, the values corresponding to the points shown in FIG. 6 are stored such that points FP2i and FP3i are associated with each other, points FP2i+1 and FP3i+1 are associated with each other, etc. In the second embodiment, the control based on the flowchart shown in FIGS. 8A and 8B is executed, but in steps F9 and F10 the target positions of the second-group and third-group lenses 72 and 73 are not calculated by use of the formula but are read out of the ROM 56. When a high-operation mode is established in the second embodiment, the second-group and third-group lenses 72 and 73 are driven while skipping a predetermined number of adjacent points (e.g., two adjacent points). For example, the second-group lens 72 is driven from point FP2i to point FP2i+3, while the third-group lens 73 is driven from point FP3i to point FP3i+3.

Figure 11B:
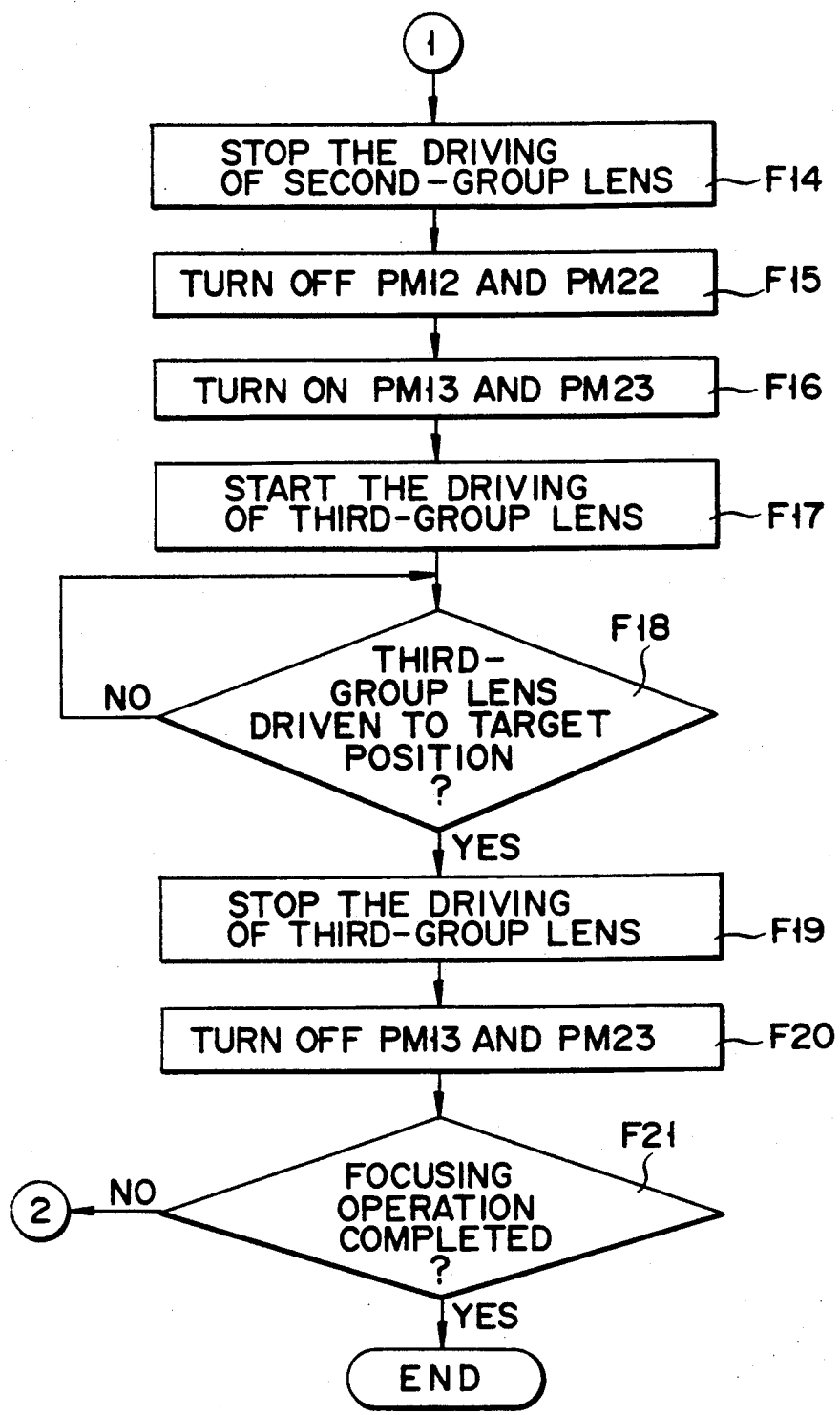

FIGS. 11A and 1B are flowcharts showing how a power focusing operation performed according to the second embodiment. The CPU 57 first executes steps F1 and F2 which are similar to those of the first embodiment, and then determines whether a fast-operation mode or a slow-operation mode is requested. Thereafter, in steps F4', F5', F7' and F8', a data-skipping number (i.e., the number of points to be skipped) is determined. If the data-skipping number is "1", the point which is adjacent to the present point in the advancing direction is read as a target position. If the data-skipping number is "3", the third point which is away from the present position in the advancing direction is read as a target position. If a minus sign (−) is attached to the data-skipping number, a point which is away from the present position in the retreating direction is read. In step F9', the CPU 57 reads the target position data on the second-group lens 72 and the corresponding data on the third-group lens 73 out of the ROM 56, in accordance with the data-skipping number. As for the other operations or control, the flowchart of the second embodiment is similar to that of the first embodiment. In FIGS. 11A and 11B, therefore, the same reference symbols are assigned to those steps which are similar or correspond to the steps shown in the flowchart in FIGS. 8A and 8B.

In the second embodiment mentioned above, the CPU 57 can perform processing at high speed since the calculation such a that performed in the first embodiment is not required. In addition, since the distance between the adjacent target positions can be easily determined in accordance with the absolute distance such that an image is not greatly affected, deterioration of the image quality can be suppressed effectively.

Figure 14:
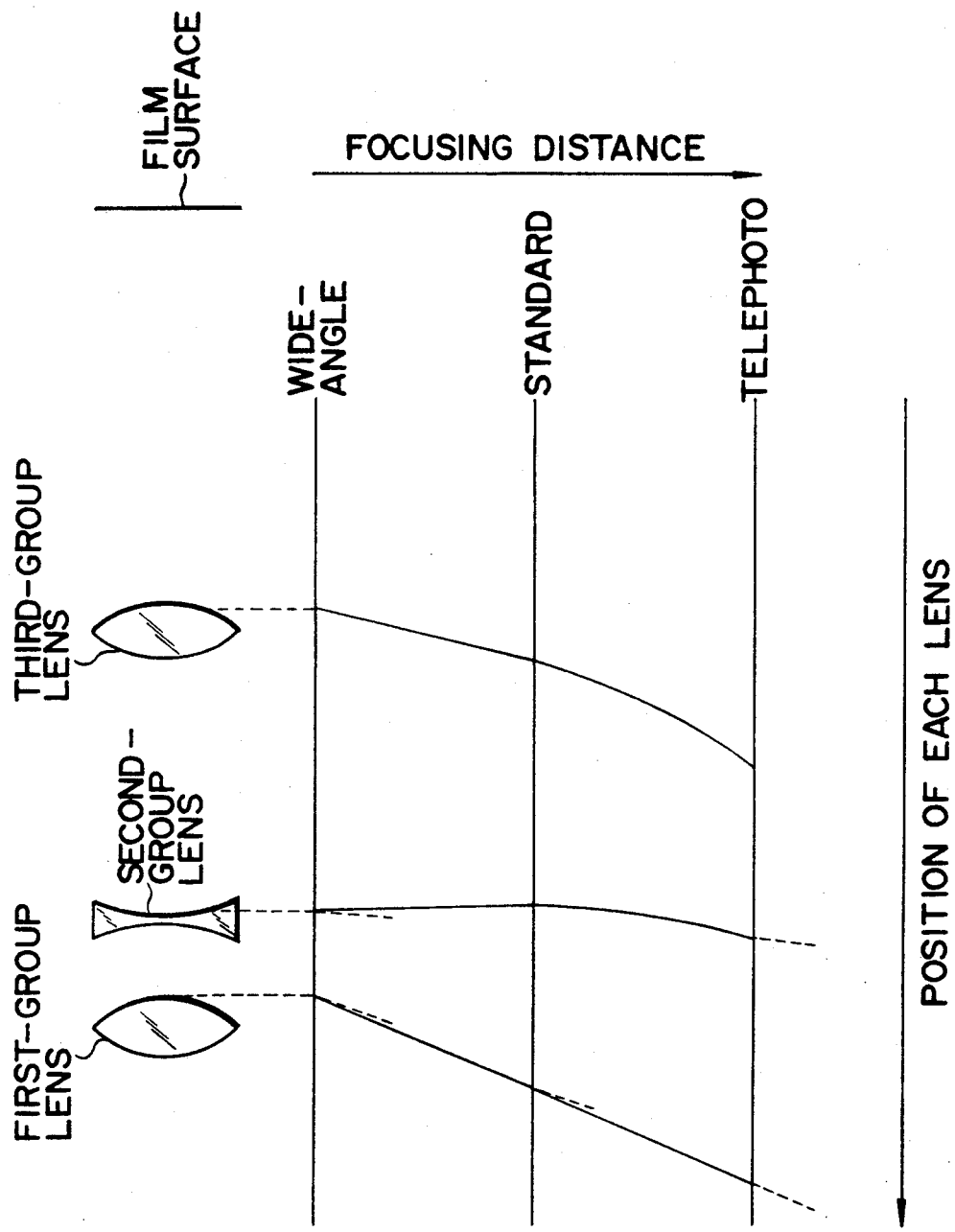

The third embodiment of the present invention will now be described. FIG. 14 shows how the lens groups of a zoom lens are moved according to the third embodiment. As is shown in FIG. 14, if the focal distance is varied in accordance with a change from the wide-angle mode to the telephoto mode, the first-group, second-group, and the third-group lenses are driven for different distances toward the focal plane. (The solid lines in FIG. 14 represent the positions of the final planes of the respective lenses.) At the time of focusing operations performed in the wide-angle, standard, and telephoto modes, the first-group and second-group lenses are driven from the position corresponding to the infinity toward the position corresponding to the minimum focusing distance, but the distances for which the lenses are driven differ, depending upon the desirable focal distances. If a zoom lens incorporates lenses which should be moved in this manner, a special frame structure, which cannot be easily made by a conventional cam, is required.

Figure 12:
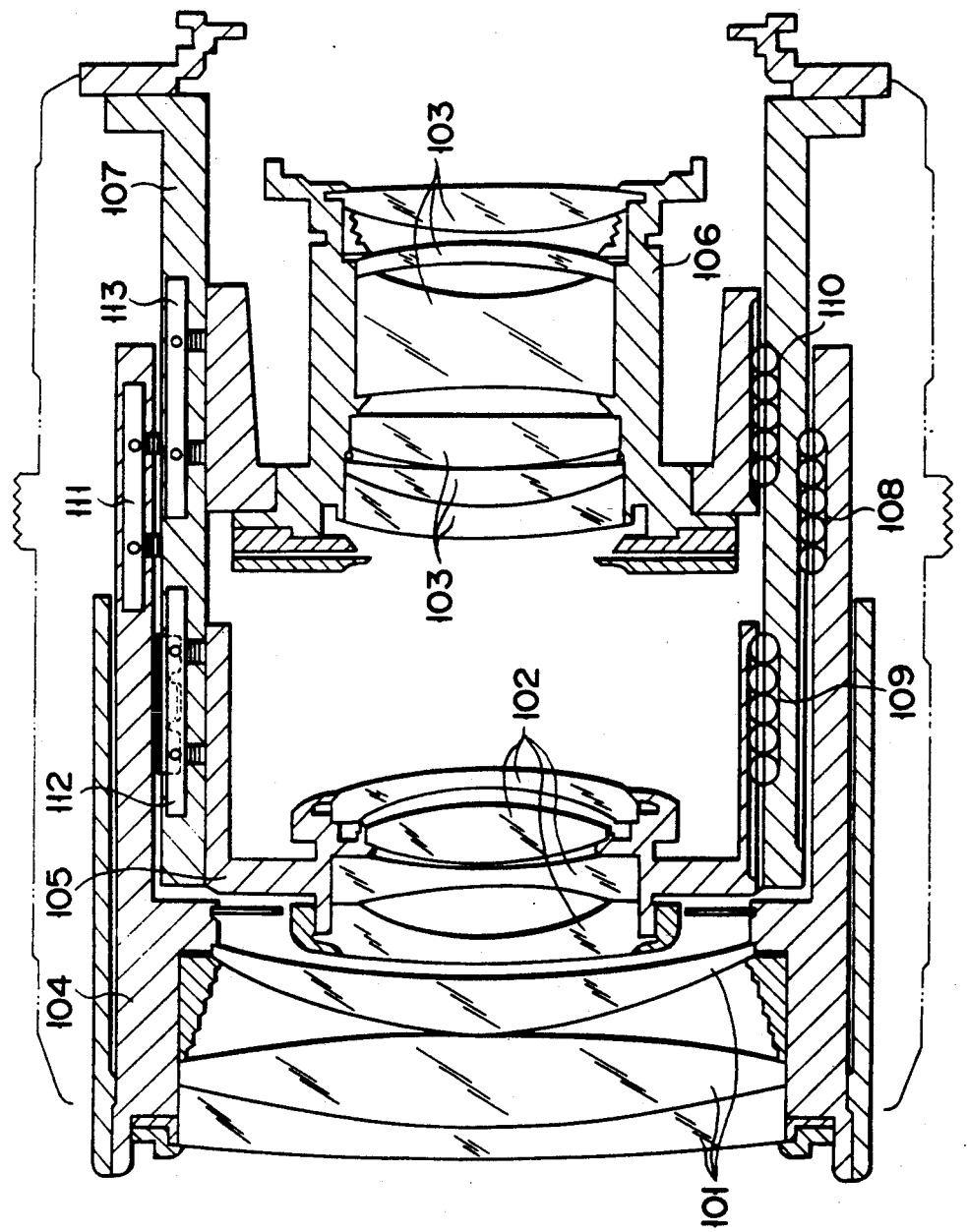

Therefore, the third embodiment employs such a frame structure as is shown in FIG. 12. As is shown in FIG. 12, a first-group lens 101, a second-group lens 102 and a third-group lens 103 are securely held by a first-group frame 104, a second-group frame 105 and a third-group frame 106. The first-group, second-group and third-group frames 104, 105 and 106 are arranged inside a fixing frame 107 and are movable only in the direction of the optical axis. The frames 104, 105 and 106 are guided by bearings 109 and 110 arranged on the inner wall of the fixing frame 107 and by bearings 108 arranged on the inner wall of the first-group frame 104, and are pressed toward the bearings by vibrating members 111, 112 and 113. The vibrating members 111, 112 and 113 are mounted on the first-group frame 104 in such a manner that they are substantially symmetric to the bearings 108, 109 and 110 with reference to the optical axis. With this structure, the first-group, second-group and third-group frames 104, 105 and 106 are positioned with reference to the fixing frame 107 by the bearings 108–110 and the vibrating members 111–113, and are not shifted from the positions predetermined in the direction of the optical axis and from the optical axis. In addition, the first-group, second-group and third-group frames 104, 105 and 106 are positioned without an unnecessary play.

Since the mounting structure of the vibrating members 111, 112 and 113 and operation of the linear ultrasonic motors are similar to those of the first embodiment, reference to them will be omitted herein.

The arrangement of the electric circuit employed in the third embodiment will be described, with reference to FIG. 15. Referring to FIG. 15, reference numerals $52_1$, $52_2$ and $52_3$ denote encoders. These encoders are driven by linear ultrasonic motors $51_1$–$51_3$ which correspond to vibrating members 111–113 (FIG. 12), respectively, and detect the movement of the respective lens frames. Each of the encoders $51_1$–$51_3$ is made up of a scale and a reader (i.e., a sensor). As in the first embodiment, two graduation lines are formed on the scale, with their graduations being shifted in phase at equal intervals. Another graduation line is also formed on the scale, so as to indicate the terminating position serving as a reference position. The scale is provided for the fixing frame 107, and the reader is provided for each of the first-group through third-group frames 104–106. When the reader moves with reference to the scale, it generates and outputs a pulse at the position corresponding to each graduation.

Reference numerals $53_1$–$53_3$ denote direction-detecting circuits. These direction-detecting circuits $53_1$–$53_3$ detect the moving directions on the basis of the information regarding the phase difference among the pulses generated by the encoders $51_1$–$51_3$. Reference numerals $55_1$–$55_3$ denote up/down counters for counting the number of encoder pulses which are generated from the time when the sensor is at the terminating position. Reference numeral 54 denotes a driving circuit for driving the ultrasonic motors $52_1$–$52_3$ (which are constituted by vibrating members 111–113, respectively), on the basis of a driving control signal supplied from an operation control section 57. Reference numeral 59 denotes a switching circuit which selects one of ultrasonic motor $52_1$–$52_3$ and allows the pulses generated by the driving circuit 54 to be supplied to the selected ultrasonic motor.

Since the driving circuit 54, ROM 56, operation control section 57, and switching circuit 59 employed in the third embodiment are similar to those of the first embodiment, reference to them will be omitted herein.

Reference numeral 58 denotes an AF module of a TTL phase difference detection type. Reference numeral $60_1$ denotes a focusing operation-input section having a button used for manual focusing. Reference numeral $60_3$ denotes a zooming operation-input section having a button used for zooming.

Figure 13:
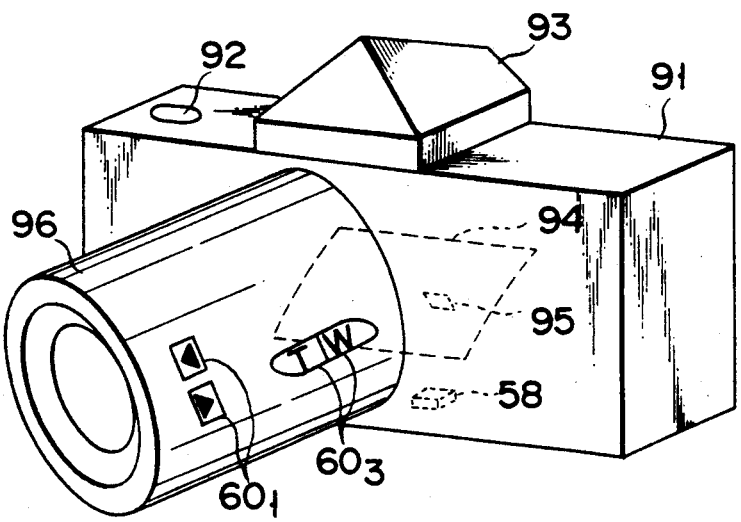

FIG. 13 is a schematic perspective view showing a zoom lens and a camera both of which are employed in the third embodiment.

As is shown in FIG. 13, the body 91 of the camera is provided with: a release button 92 capable of outputting a signal corresponding to a half-depressed state (i.e., a first release state) and a signal corresponding to a fully-depressed state (i.e., a second release state); a viewfinder 93 which employs a pentaprism used for determining the angle of view; a quick-return type main mirror 94 for guiding light to the viewfinder 93; a sub mirror 95, attached to the center of the main mirror 94, for guiding light to an AF module 58 contained in the bottom of the body 91; and the above-mentioned AF module 58. On the other hand, the zoom lens 96 is provided with the focusing operation-input section $60_1$ and the zooming operation-input section $60_3$ mentioned above. The focusing operation-input section $60_1$ is operated at the time of manual focusing (power focusing) and is capable of outputting the signals respectively corresponding to the half-depressed state and fully-depressed state.

Next, a description will be given as to how a zooming operation is performed in the third embodiment, with reference to the flowchart shown in FIGS. 16A and 16B. Since the photo MOS relays employed in the switching circuit 59 operate in a similar manner to that of the first and second embodiments, reference to the operation of the photo MOS relays will be omitted in the description below. First of all, the zooming operation-input section $60_3$ is operated. In response to this operation, integers i and k are read out in step F101. Integer i represents the zoom state memorized when the operation is stopped last, while integer k represents a focus state. If the telephoto button of the zooming operation-input section $60_3$ is operated, the condition "i'=i+1" is determined in step F102. If, on the other hand, the wide-angle button of the zooming operation-input section $60_3$ is operated, the condition "i'=i-1" is determined. However, since the subsequent operations are similar between the two cases, the following explanation will be made on the assumption that the telephoto button is operated.

The ROM 56 stores data on the driving distances P1i to P3i for which the lens group should be driven from their initial positions (the infinity or wide-angle positions) in accordance with a zooming operation. It also stores data on the driving distances Q1i(k) to Q3i(k) for which the lens groups should be driven in accordance with a focusing operation. (With respect to driving distances P1i–P3i and Q1i(k)–Q3i(k), see the graphs shown in FIGS. 17 and 18.) In step F103, the CPU 57 (i.e., the operation control section) reads the data on the driving distances out of the ROM 56 in accordance with the zoom state i' and the focus state k, and calculates target position values on the basis of the readout data, as follows:

$$P1i'(k) = P1i' + Q1i'(k)$$

$$P2i'(k) = P2i' + Q2i'(k)$$

$$P3i'(k) = P3i' + Q3i'(k)$$

Then, the CPU 57 starts the driving of the first-group lens 101 in step F104, and determines in step F105 whether the first-group lens 101 has been moved to target position P'1i'(k) by reading the output of counter $55_1$. In step F106, the CPU 57 stops the driving of the first-group lens 101 when the first-group lens 101 has been moved to target position P'1i'(k). Likewise, the CPU 57 starts and stops the driving of both the second-group and third-group lenses 102 and 103 in steps F107–F112. Thereafter, in step F113, the CPU 57 checks whether or not the zooming operation is still being performed. If the telephoto button is still being pushed, the value of i' is increased by "1", and the flow returns to step F103. If the telephoto button is not pushed, then the flow advances to step F115 wherein the value of i' is written in a memory as a value representing the final zoom state. After the value of i' is written, the operation is brought to an end.

As is understood in FIGS. 17 and 18, the driving distances P1i–P3i and Q1i(k)–Q3i(k) are determined in such a manner that the resolution produced by them does not give unpleasant feeling to the operator. Since the driving distances are determined in this manner, the current consumption is small and the circuit arrangement is simple, as in the first embodiment. In addition, the operator looking into the viewfinder does not feel unpleasant when he or she performs the zooming operation.

Figure 19A:
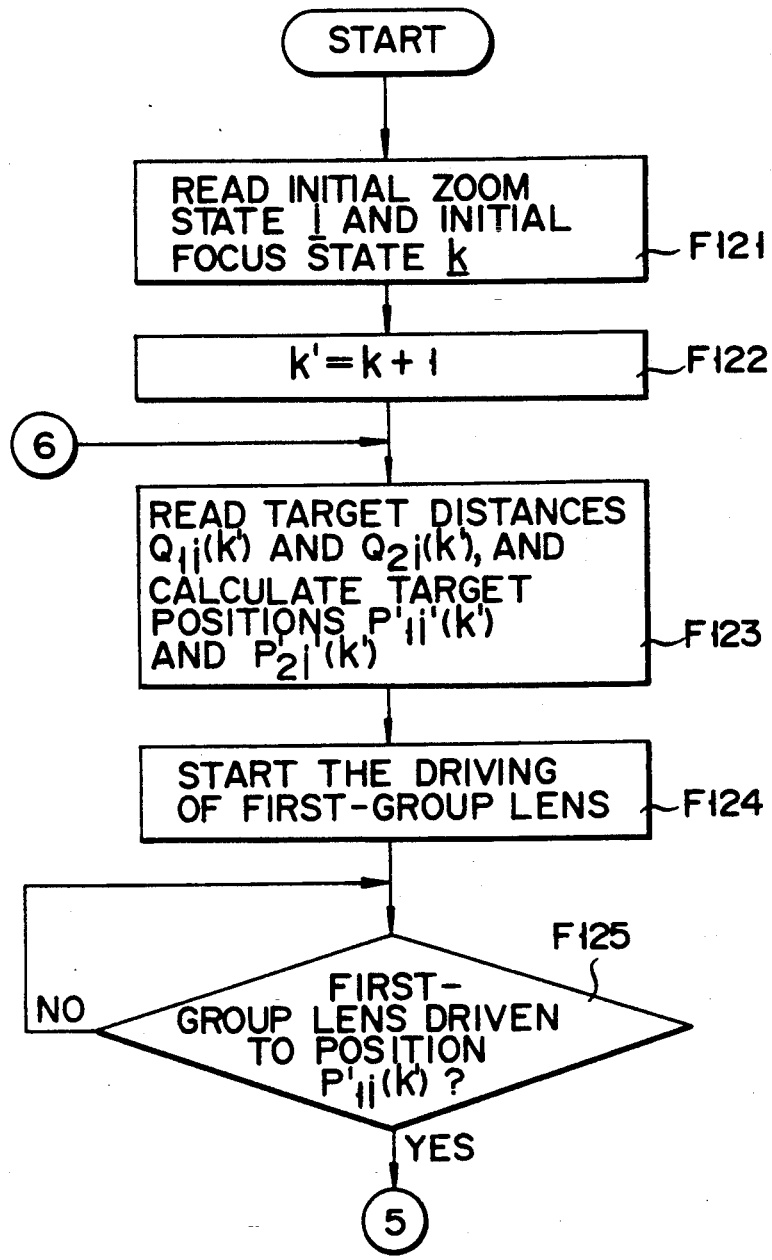
Figure 20:
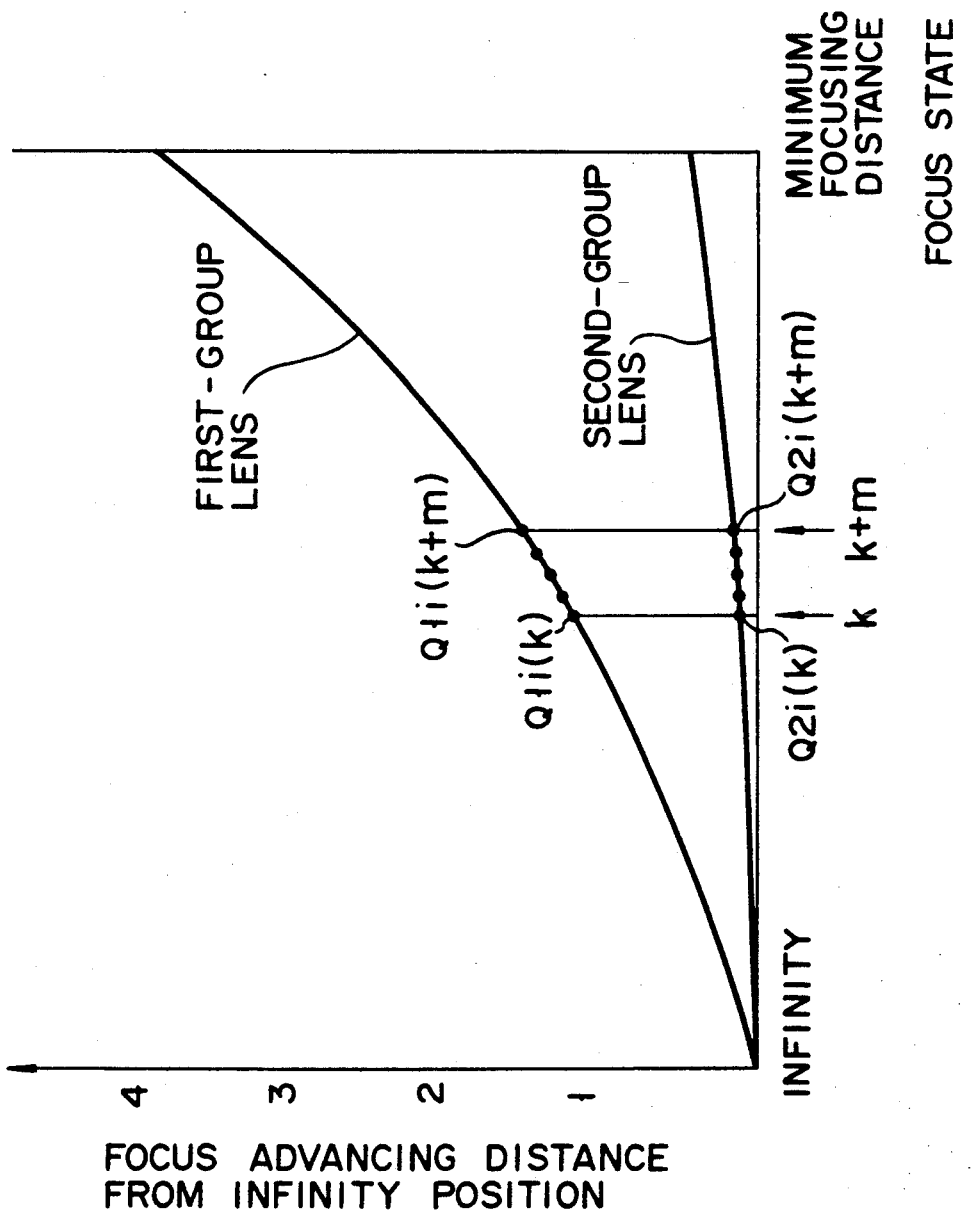

Next, manual focusing will be described, with reference to the flowchart shown in FIGS. 19A and 19B. It should be noted that the term "manual focusing" is used herein to refer to so-called power focusing, wherein the lens groups are electrically driven in response to the operator's manual operation. The power focusing (i.e., the manual focusing) is performed in a substantially similar manner to that of zooming. That is, the operator operates a button of the focusing operation-input section $60_1$. In response to this operation, the CPU 57 reads the zoom state i and the focus state k in step F121. If the advancing button is operated, the condition "k'=k+1" is determined in step F122. If, on the other hand, the retreating button is operated, the condition "k'=k−1" is determined. In steps F123 to F132, the CPU 57 executes similar steps to those of the zooming operation. That is, the CPU 57 calculates target positions, alternately drives the first-group lens 101 and second-group lens 102, and after the end of the focusing operation writes the data on the final focus state. An example of an operation performed at the time of an advancing mode is shown in FIG. 20.

Figure 21A:
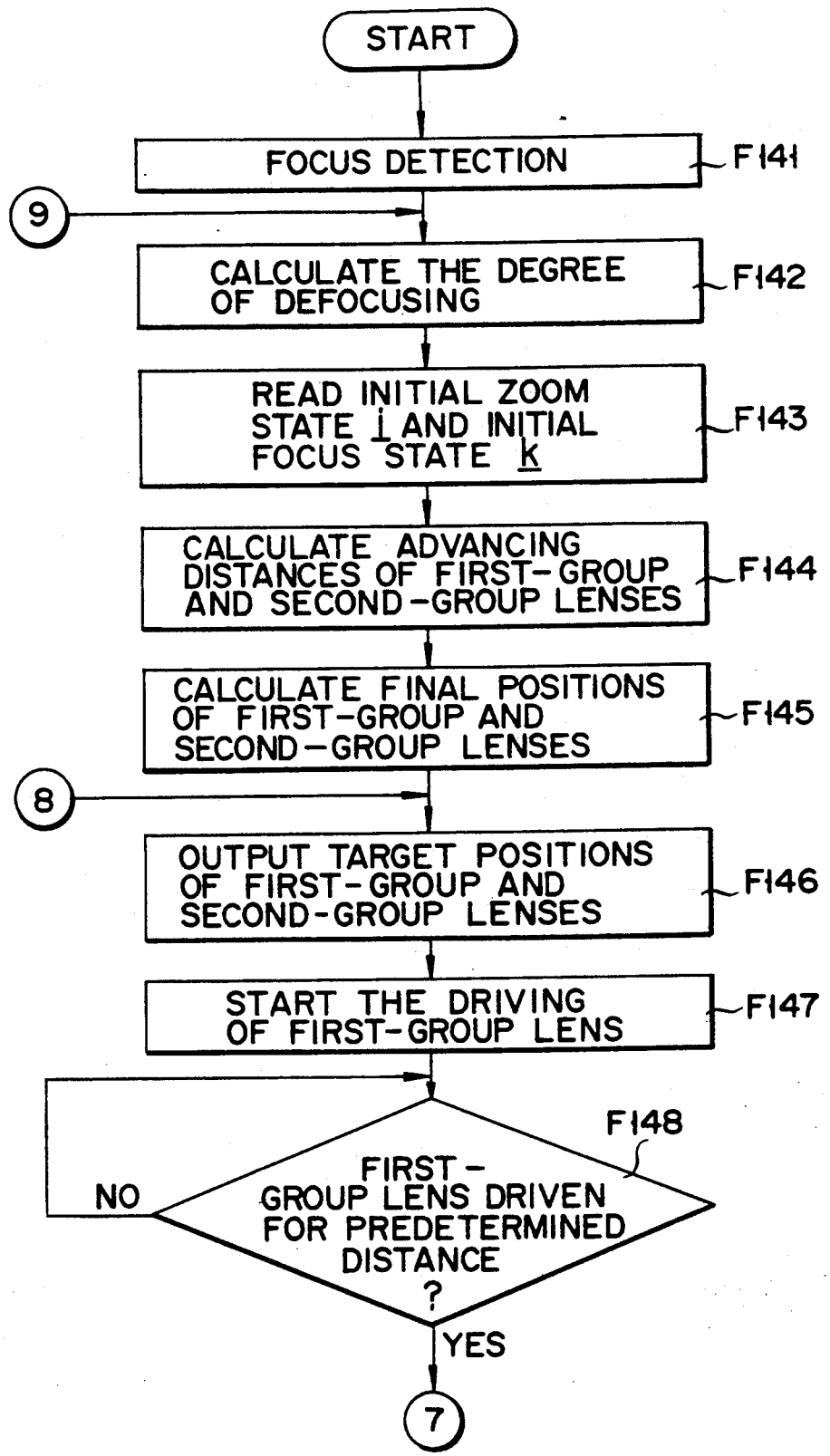
FIGS. 21A and 21B form a flowchart showing the procedures for performing an auto focus operation.
Figure 21B:
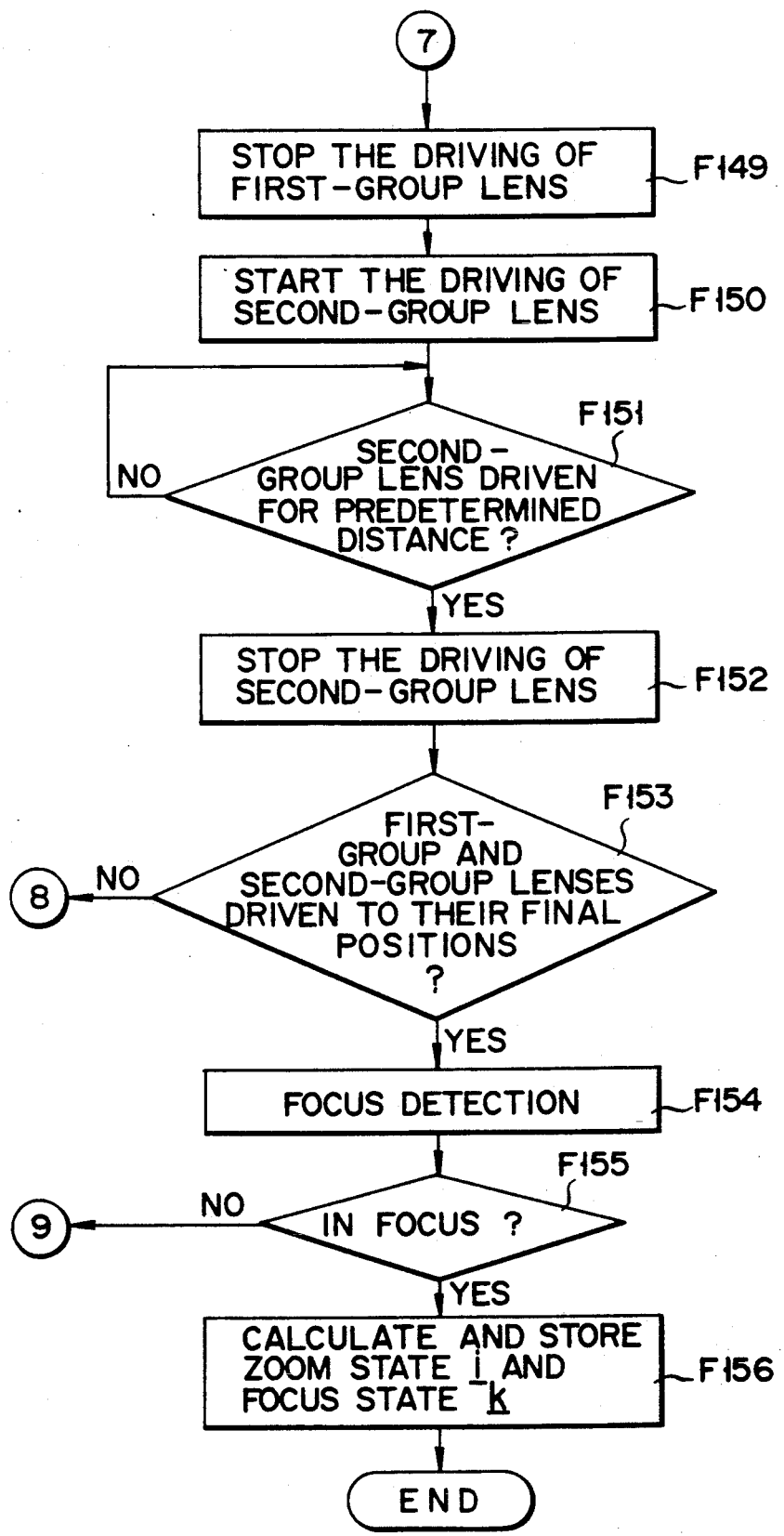

A description will be given as to how an auto focusing operation is performed in the third embodiment, with reference to the flowchart shown in FIGS. 21A and 21B. To start the auto focusing operation, the operator depresses the release button 92 halfway. In response to this, the CPU 57 performs focus detection in step F141, and calculates the degree of defocusing in accordance with the focus detection in step 142. Next, the CPU 57 reads values i and k in step F143. Value i represents the initial zoom state memorized in the last-time operation, while value k represents a focus state. In step F144, the CPU 57 reads an advancing distance-conversion coefficient K corresponding to the values i and k out of a memory, and calculates advancing distances of the first-group and second-group lenses 101 and 102 by using e.g. the following formula:

$$\Delta x = K \cdot d$$

where $\Delta x$ is an advancing distance and d is the degree of defocusing. In steps F145 to F153, the CPU 57 drives the first-group and second-group lenses 101 and 102 in a similar manner to that of power focusing until they are advanced to the respective final positions determined by the advancing distances. Thereafter, in step F154, the CPU 57 performs focus detection once again. If the first-group and second-group lenses 101 and 102 are in focus in step F155, the CPU 57 stores data regarding the zoom and focus states in step F156 and brings the operation to an end. If, on the other hand, the first-group and second-group lenses 101 and 102 are out of focus in step F155, then the flow returns to F142.

As has been described, in the third embodiment, numbers representing zoom and focus states are determined beforehand, and data on the position to which each lens group should be moved in accordance with the zoom state and focus state numbers is stored in a memory. Even in a zoom lens whose lens groups have to be moved in a complicated manner, zooming and power focusing are easily accomplished from any state. Accordingly, the lens and camera of the third embodiment have similar advantages to those described above in relation to the second embodiment.

The fourth embodiment of the present invention will now be described. The structure of the fourth embodiment is substantially similar to that of the third embodiment, except that the focusing operation-input section $60_1$ and the zooming operation-input section $60_3$ are capable of outputting signals corresponding half-depressed and fully-depressed states of buttons, and that the electric circuit comprises two driving circuits $54_1$ and $54_2$ and two switching circuits $59_1$ and $59_2$, as is shown in FIG. 22. Each of the switching circuits $59_1$ and $59_2$ employed in the fourth embodiment has a somewhat complicated circuit configuration in comparison with that of the switching circuit shown in FIG. 7.

First, zooming and focusing performed according to the fourth embodiment will be described. The zooming and focusing can be performed in two modes: a fast-operation mode wherein the lenses are driven coarsely at a high speed, and a slow-operation mode wherein the lenses are driven minutely at a low speed. According to the fourth embodiment, when the fast-operation mode is selected by fully depressing the operation button, the value of i' is increased by e.g. "3" in steps F102 and F114 (FIGS. 16A and 16B), and the value of k' is increased by e.g. "3" in steps F122 and F131 (FIGS. 19A and 19B).

A description will be given as to how the lenses are driven in the fourth embodiment. In the case where the lenses are selectively driven by a single driving circuit, as in the second embodiment, acceleration and deceleration are alternately repeated, so that the camera body and the lenses may vibrate. If the driving of the first-group lens 101 is stopped and simultaneously the driving of the second-group lens 102 is started, the shock caused by the deceleration and that caused by the acceleration can cancel each other, suppressing the vibration. In the fourth embodiment, therefore, driving circuit $54_2$ is electrically connected to the motor $52_2$ of the second-group lens 102 before the driving of the first-group lens 101 is stopped, and is supplied with a driving start signal immediately after driving circuit $54_1$ is supplied with a driving stop signal. In the four embodiment, two driving circuits are required, but the number of driving circuits need not be increased without reference to the number of lens groups to be driven. By use of the two driving circuits, the vibration at the time of driving the lenses can be suppressed.

The focusing operation-input section and zooming operation-input section employed in the fourth embodiment are detailed in U.S. Pat. No. 4,851,869 (title: "Lens Driving Apparatus"), filed by Toshiaki ISHIMARU et al. on Jan. 13, 1988, published on Jul. 25, 1989, and assigned to Olympus Optical Co., Ltd. The descriptions in this U.S. Patent are incorporated herein as a reference.

If the electronic dial disclosed in U.S. Pat. No. 4,851,869 is employed in the fourth embodiment, fine adjustment of the driving speed is enabled, and the operation of the fourth embodiment is further improved, accordingly.

As has been described in detail, the lens driving control apparatuses of the first to fourth embodiments do not employ a cam cylinder, such as that of a conventional apparatus. Even if the movement of lenses includes inflection points, such complicated movement can be accomplished easily, and the lenses can be as small as possible. In addition, according to the first to fourth embodiments, the driving of the lenses can be controlled on a time-divisional basis, which control cannot be performed as long as the positional relationships among lens groups are determined by a cam groove formed in a cam cylinder. Therefore, the power consumption at the time of driving the lenses can be reduced, and only one or two driving circuits are required for driving the lenses. Further, according to the first to fourth embodiments, the lenses can be driven such that they maintain desirable positional relationships even when they are being driven. This lens-driving technique is applicable to the zooming and focusing operations of a TTL camera. Still further, the lens groups driven by that technique are not dynamically interfered with one another.

Figure 23:
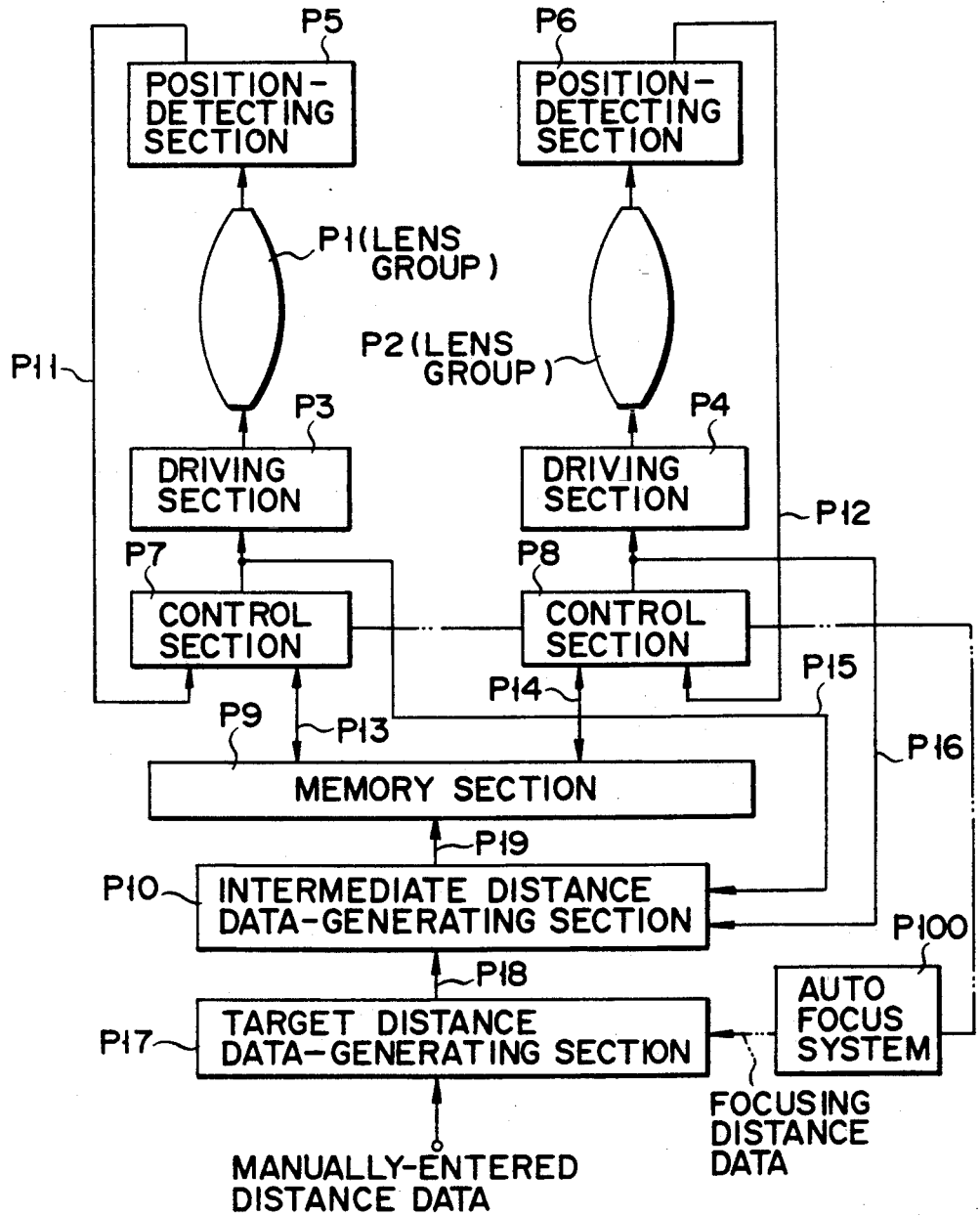
FIG. 23 is a block circuit diagram illustrating the fifth embodiment of the present invention.

The fifth embodiment of the present invention will now be described, with reference to FIGS. 23 and 24. Referring first to FIG. 23, a first lens group P1 is associated with the following: driving section P3 for driving the first lens group P1; position-detecting section P5 for detecting the position of the first lens group P1; and control section P7 for controlling driving section P3. Likewise, a second lens group P2 is associated with the following: driving section P4 for driving the second lens group P2; position-detecting section P6 for detecting the position of the second lens group P2; and control section P8 for controlling driving section P4. A target distance data-generating section P17 outputs target distance data P18, on the basis of either focusing distance data output by an auto focus system P100 or distance data manually entered by the operator. An intermediate distance data-generating section P10 is supplied with both the target distance data P18 output by section P17 and control signals P15 and P16 output by control sections P7 and P8. On the basis of these kinds of data, section P10 outputs intermediate distance data P19 which represents a position intermediate between the driving start position and the position corresponding to the target distance data P18, and supplies the intermediate distance data P19 to a memory section P9.

Figure 24:
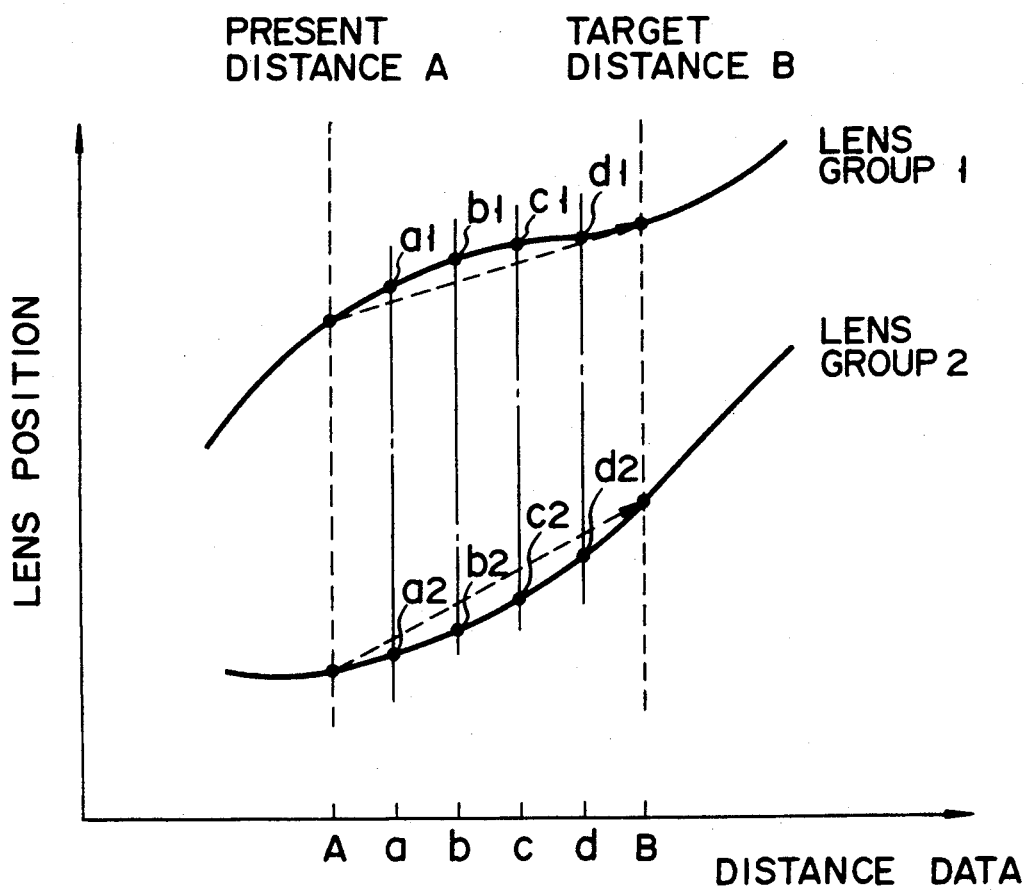
FIG. 24 is a graph showing the relationships between the distance information and lens position information which are stored in the storage section employed in the fifth embodiment.

As is indicated by the solid lines in FIG. 24, the memory section P9 stores the data on the positional relationships between the lenses P1 and P2 in relation to distance data (e.g., data on the distance to an object to be photographed, and data on the focusing distance). In other words, the memory section P9 stores lens position data of various kinds, including the data representing lens positions at which the first and second lens groups P1 and P2 can satisfactory show their optical characteristics even when they are driven minutely. Since the memory section P9 stores the positional data on each of the first and second lens groups P1 and P2 in relation to minutely-divided distance data, it can supply the control sections P7 and P8 with lens position data P13 and P14 corresponding to the intermediate distance data P19. The control sections P7 and P8 compare this lens position data P13 and P14 with position signals P11 and P12 (which represent the lens positions actually detected by the position-detecting sections P5 and P6), and supply control signals P15 and P16 to the driving sections P3 and P4, to thereby drive the lens groups P1 and P2 to the positions corresponding to the lens position data P13 and P14.

The operation of the first embodiment having the above structure will be described. Let it be assumed that the first and second lens groups P1 and P2 are at the positions corresponding to the present distance A shown in FIG. 24. If, in this case, the target distance data-generating section P17 outputs target distance B as target distance data P18, then the intermediate distance data-generating section P10 outputs the intermediate distance data P19 corresponding to minutely-divided intermediate distance a. This intermediate distance data P19 is input to the memory section P9. Upon the input of data P19, the memory section P9 outputs lens position data which allows the first and second lens groups P1 and P2 to can satisfactory show their optical characteristics when they are driven for intermediate distance a, and supplies that lens position data to the control sections P7 and P8. On the basis of the lens position data and the output of position-detecting section P5, control section P7 controls driving section P3 such that the first lens group P1 is moved to lens position a1 corresponding to intermediate distance a. Simultaneously, control section P8 controls driving section P4 such that the second lens group P2 is moved to lens position a2 in a similar way.

After detecting, on the basis of control signals P15 and P16, that control sections P7 and P8 cause the first and second lens groups P1 and P2 to lens positions a1 and a2, respectively, the intermediate distance data-generating section P10 supplies the memory section P9 with intermediate distance data corresponding to intermediate distance b. In response to this, the memory section P9 outputs lens position data which represents lens position b1 corresponding to intermediate distance b, and supplies that lens position data to control section P7. Likewise, the memory section outputs lens position data which corresponding to lens position b2 corresponding to intermediate distance b, and supplies that lens position data to control section P8. Therefore, the first and second lens groups 1 and 2 are moved for intermediate distance b, without their optical characteristics being adversely affected in the meantime. In the manner described, the intermediate distance data-generating section P10 and the memory section P9 sequentially produce lens position data representing minutely-divided intermediate distances c, d . . . , until the first and second lens groups P1 and P2 are moved to their target positions in response to the output of target distance B.

In a conventional apparatus which utilizes cam groups, the lens groups are driven, when new distance data is generated as a target distance, such that they attain the positional relationships corresponding to the target distance. That is, the lens groups are linearly moved from the present positions to the target positions, as is indicated by the broken lines in FIG. 24. As long as the lens groups are driven in this way, they may fail to maintain desirable positional relationships when they are being moved to the target positions. In other words, desirable optical characteristics may not be ensured during the movement of the lens groups. In the fifth embodiment, in contrast, the memory section P9 does not output lens position data which is directly related to final target positions. Instead, intermediate distance data is generated, and the memory section P9 outputs lens position data corresponding to positions a1-d1 and a2-d2 shown in FIG. 24. Therefore, the lens groups can move to their final target positions, while simultaneously maintaining desirable positional relationships.

Figure 27:
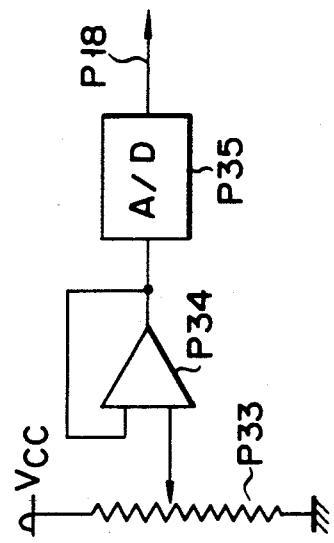

A target distance data-generating section which can be employed in the fifth embodiment will be explained, with reference to FIGS. 25-27.

Figure 25:
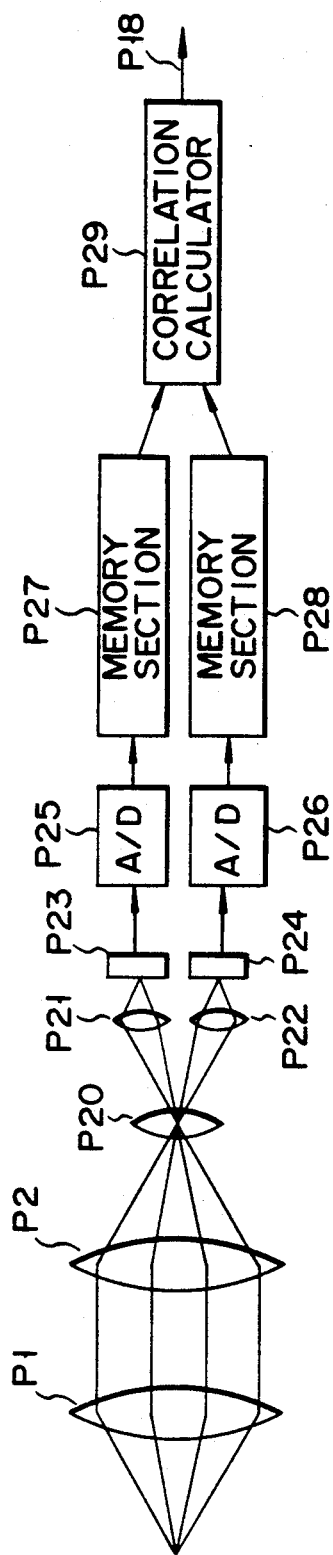
FIGS. 25–27 show a specific example of a target distance data-generating section employed in the fifth embodiment of the present invention.
Figure 26:
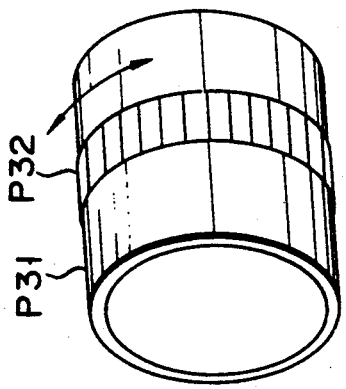

FIG. 25 shows an example of a distance-measuring system employed in a single-lens reflex camera. Referring to FIG. 25, a light beam coming from an object to be photographed passes through the first and second lens groups P1 and P2. A condenser lens P20 arranged in the focal plane and separator lenses P21 and P22 focus the light beam onto imaging elements P23 and P24. Analog signals output from the imaging elements P23 and P24 are converted into digital signals by A/D converters P25 and P26 and are then stored in memory sections P27 and P28, respectively. A correlation calculator P29 calculates the correlation between the luminous patterns formed on the imaging elements P23 and P24. Since this correlation varies in accordance with the focus states of the first and second lens groups P1 and P2, the distance to the object can be measured on the basis of the correlation.

In the case of FIG. 25, an output of the distance-measuring system is used by the target distance data-generating section. However, the distance to the object may be measured by manually rotating the lens barrel, as is shown in FIG. 26. More specifically, a manual distance-adjusting member P32 is provided around the lens barrel P31, and the operator can freely adjust the distance by rotating the adjusting member P32. If the distance to the object to be photographed is adjusted in the manner shown in FIG. 26, the distance data is converted into an electric signal by employing the circuit shown in FIG. 27. In the circuit shown in FIG. 27, the resistance of a resistor P33 is varied in accordance with the rotation of the adjusting member P32, and this variation is converted into a voltage. This voltage is picked up by an operation amplifier P34, is converted into a digital signal by an A/D converter P35, and is then output as distance data P18.

The sixth embodiment of the present invention will now be described, with reference to FIGS. 28-32.

Figure 28:
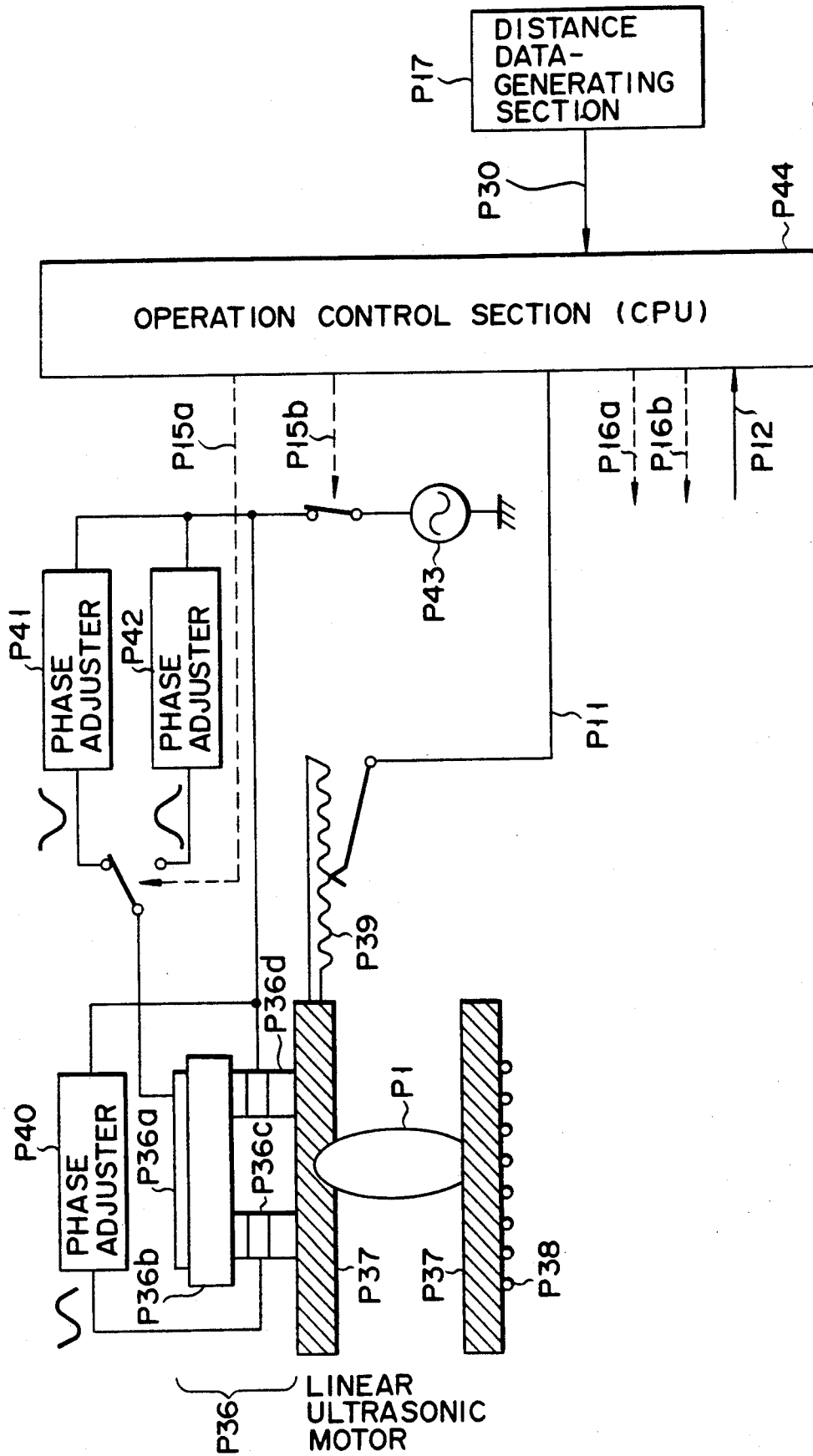
FIG. 28 is a block circuit diagram showing the sixth embodiment of the present invention.

FIG. 28 is an electric circuit diagram of the sixth embodiment. As is seen from FIG. 28, the sixth embodiment employs linear ultrasonic motors (hereinafter abbreviated as "LUM") which are similar to those of the first embodiment. In general, a lens-driving section incorporates a DC motor, a stepping motor, or the like, and the torque of such a motor is transmitted to a lens as a driving force. In this type of lens-driving section, however, a transmission mechanism is needed to transmit the torque to the lens. In addition, since the motor is large in size, one motor cannot be provided for each lens group, respectively, without resulting in an increase in the size of the lens. Further, the transmission mechanisms of motors may interfere with one another. In consideration of these disadvantages, ultrasonic vibration is used in the sixth embodiment, and a LUM similar to that of the first embodiment is used for directly driving the lens.

Referring to FIG. 28, reference symbol P36 denotes a LUM. This LUM P36 is comprised of: a bending-vibration member which is made up of a piezoelectric ceramic element P36a and an elastic element P36b; and two longitudinal-vibration members P36c and P36d each of which is a laminated piezoelectric member. Longitudinal-vibration member P36c is connected to longitudinal-vibration member P36d through a phase adjuster P40 by which the phase is shifted by 180°. Longitudinal-vibration member P36c is also connected to a high-frequency power source P43 through a switch SW1 which is controlled in accordance with a control signal P15b supplied from an operation control section (CPU) P44 obtained by e.g. a microcomputer. The control signal P15b is a signal for turning the LUM P36 on or off. The piezoelectric ceramic element P36a is connected to a switch SW2 which is controlled in accordance with a selection signal P15a supplied from the CPU P44. Through this switch SW2 and a parallel circuit of phase adjusters P41 and P42, the piezoelectric ceramic element P36a is connected to switch SW1. The selection signal P15a and the control signal P15b jointly constitute the control signal P15 shown in FIG. 23. The sixth embodiment comprises a plurality of lens groups, as in the first embodiment, but since each lens group is driven by a similar LUM to the LUM P36 mentioned above, reference to the LUMs other than LUM P36 will be omitted herein.

With the above structure, each vibrating member is vibrated in response to an ultrasonic signal from the high-frequency power source P43. Phase adjusters P41 and P42 are controlled such that the phase of the vibration of the bending-vibration member P36a, P36b and the phase of the vibration of the two longitudinal-vibration members P36c and P36d are shifted by 90°. The reason that the two phase adjusters are employed is to switch the driving direction of the LUM between the advancing direction and the retreating direction. The driving direction of the LUM can be switched, with one of phase adjusters P41 and P42 being selected by mean of switch SW2. Phase adjuster P40 is controlled such that the phase of the vibration of one longitudinal-vibration member and the phase of the vibration of the other longitudinal-vibration member are shifted by 180°.

Figure 29:
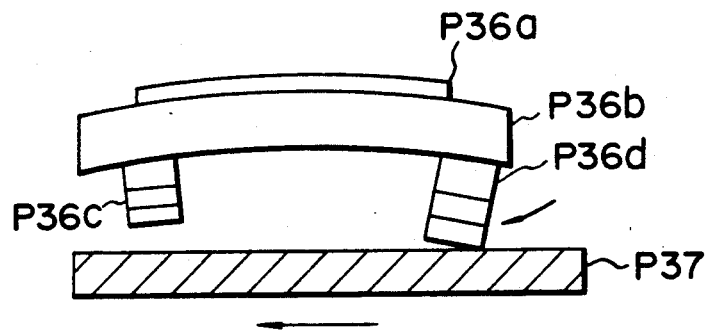
FIGS. 29 and 30 are explanatory illustrations of a linear ultrasonic motor employed in the sixth embodiment.
Figure 30:
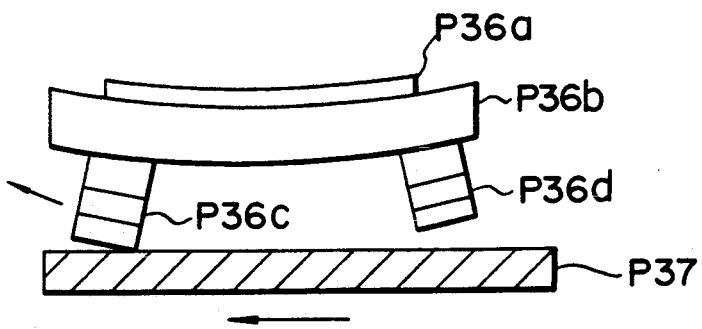

FIGS. 29 and 30 show how the LUM P36 vibrates. FIG. 29 shows the state where the bending-vibration member bends upward, while FIG. 30 shows the state where the bending-vibration member bends downward. In the state shown in FIG. 29, longitudinal-vibration member P36c contracts and longitudinal-vibration member P36d expands. In this case, a lens barrel P37 is moved in the direction indicated by the arrow, being pushed by longitudinal-vibration member P36d. In the case shown in FIG. 30, longitudinal-vibration member P36c expands and longitudinal-vibration member P36d contracts. In this case as well, the lens barrel P37 is moved in the direction indicated by the arrow. Therefore, the lens barrel P37 is driven in the arrow direction by the alternate contraction and expansion of longitudinal-vibration members P36c and P36d.

Turning back to FIG. 28, ball bearings P38 are arranged on that portion of the lens barrel P37 which opposes the LUM P36, so as to smoothly move the lens barrel P37. A contact P39 capable of outputting a pulse (i.e., position signal P11) is provided at one end of the lens barrel P37.

The CPU P44 controls the driving of a plurality of lens groups and reads distance data P30 from target distance data-generating section P17. In other words, the control sections P7 and P8, memory section P9 and intermediate distance data-generating section P10 (which are shown in FIG. 23) are functionally incorporated in the CPU P44. A ROM included in the CPU (a read-only memory) P44 is employed as the memory section, and digital data regarding the positional relationships among lens groups is stored in the ROM in relation to distance data. The digital data stored in the ROM is in the form of a table, as is shown in FIG. 32. In FIG. 32, the "distance data" corresponds to the addresses of the ROM, and "data" corresponds to the position of each lens. In the case where two lens groups are employed, two pieces of data are required for the same distance data. In the ROM, therefore, the position data (DR1n) on lens group 1 is stored at the storage areas having even-numbered addresses, and the position data (DR2n) on lens group 2 is stored at the storage areas having odd-numbered addresses. The "n" denotes a minimum unit of distance data, and is 1 for a distance of 10 m and is 2 for a distance of 5 m.

A description will be given, with reference to the flowchart shown in FIG. 31, as to how the CPU P44 executes the control of the driving of lens groups. In step #1, the CPU P44 receives target distance data from the target distance data-generating section P17. In the description below, let it be assumed for simplicity that a target distance of 2 m is determined when the present distance is 10 m. In step #2, the CPU 44 calculates intermediate distance data. In the case where the present distance is 10 and the target distance is 2 m, the intermediate distance data calculated by the CPU 44 is 5 m. In step #3, the CPU P44 reads position data corresponding to the intermediate distance data out of the ROM. As is understood in FIG. 32, the data stored in the storage area of address "04" is used as the position data on lens group 1, and the data stored in the storage area of address "05" is used as the position data on lens group 2. In step #4, the CPU P44 determines the driving directions of lens groups 1 and 2, on the basis of the position data corresponding to the present distance data and the position data corresponding to the intermediate target distance data.

Then, the driving of lens group 1 is controlled in steps #5, #6 and #7, and the driving of lens group 2 is controlled in steps #8, #9 and #10. In step #5, the CPU P44 counts the number of position signal (pulses) P11 (FIG. 28), and determines whether or not the count corresponds to the position data related to the intermediate distance data. If it is determined in step #5 that the count does not correspond to the position data, then step #6 is executed wherein lens group 1 is driven in the direction determined in step #4. More specifically, the CPU P44 turns on the driving signal P15b and selects the phase difference determined by phase adjusters P41 and P42 by issuing a selection signal. If it is determined in step #5 that the count corresponds to the position data, then step #7 is executed wherein the CPU P44 stops the driving of lens group 1 by turning off the driving signal P15b. In steps #8, #9 and #10, the driving of lens group 2 is controlled in a similar manner to that of lens group 1.

In step #11, the CPU P44 determines whether or not both lens groups 1 and 2 have reached and stopped at the positions corresponding to the intermediate distance data. If one of the lens groups has not yet reached the position corresponding to the intermediate distance data, the flow returns to step #5, and either lens group 1 or lens group 2 is driven until it reaches and stop at that position. If, on the other hand, both lens groups have reached and stop at the position, then the flow advances to step #12. In this step #12, the CPU P44 determines whether or not the intermediate distance data is the same as the target distance data. If the intermediate distance data differs from the target distance data, the flow returns to step #2, so as to calculate new intermediate distance data.

With respect to the case mentioned above, "3 m" and then "2 m" are calculated as new intermediate data, for the control of the driving of the lens groups. After the two lens groups reach and stop at the final target positions, the control of the driving of the lens groups is brought to an end.

The fifth and sixth embodiments were described, referring to the case where two lens groups are driven. Even if three or more lens groups are driven, the driving of them can be controlled in a similar method by adding a driving section and a driving circuit and increasing ROM data. In addition, further minute position control is enabled by further dividing the minimum unit of distance data and increasing ROM data.

Figure 31:
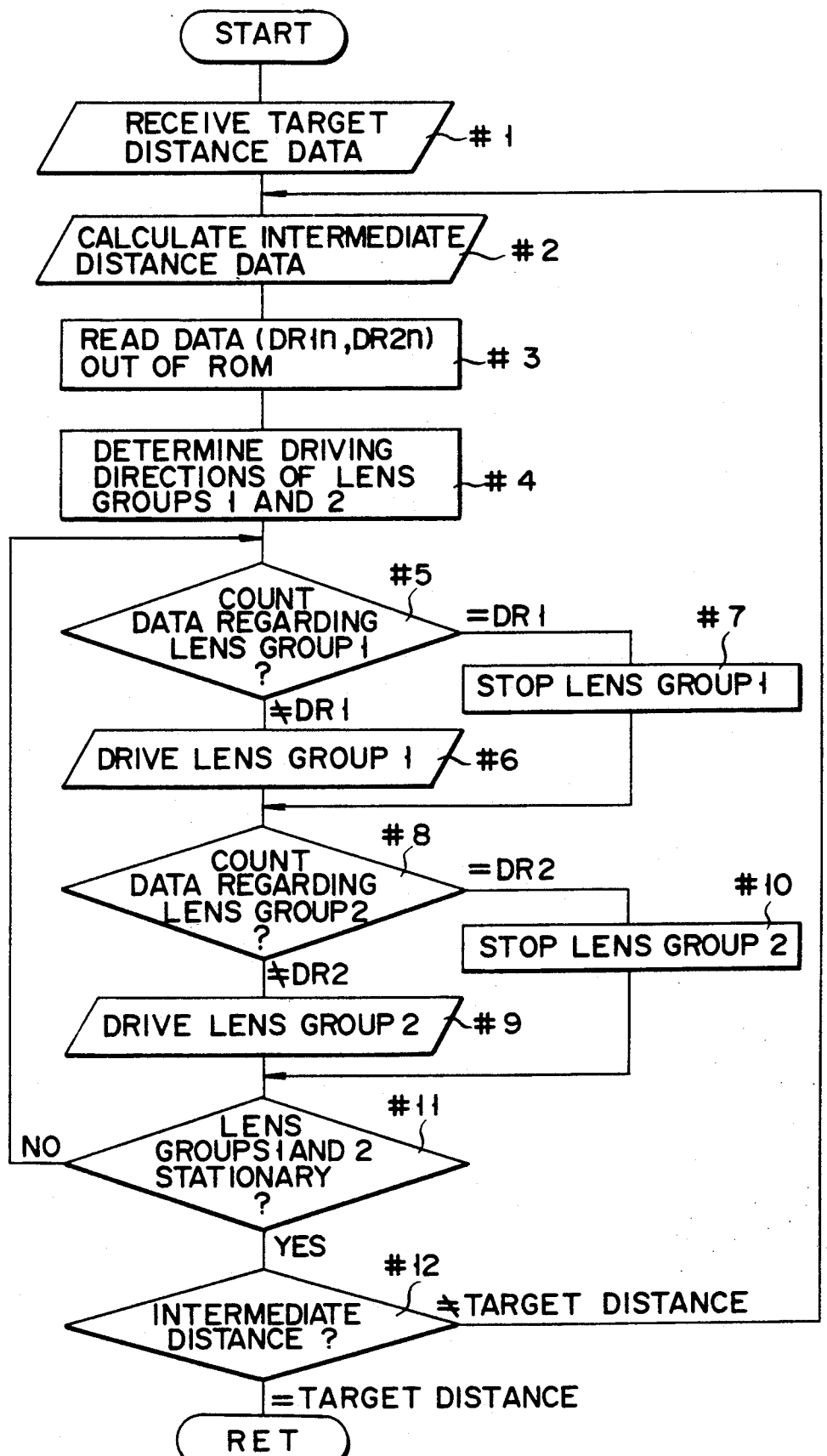
FIG. 31 is a flowchart showing how the sixth embodiment operation.

If focus detection using the auto focus system P100 (FIG. 23) is intended during the driving of lens groups, then a signal representing that the two lens groups are stationary may be supplied to the auto focus system P100 in step #11 shown in FIG. 31. With this processing added to the flowchart shown in FIG. 31, focus detection can be performed only when the two lenses are stationary and have predetermined relationships. It should be noted that the focus detection can be performed with high accuracy as long as both lenses are stationary.

A lens comprising a plurality of lens groups may be a zoom lens whose focusing distance is variable depending upon the arrangement of the lens groups. In the case where such a zoom lens is employed, focusing distance data is generated in accordance with the operation of the manual distance-adjusting member P32 described above with reference to FIGS. 26 and 27.

If the fifth or sixth embodiment is applied to a TTL auto focus camera or another type of camera which performs focus detection on the basis of a light beam which comes from an object to be photographed and passes through a driving lens, then desirable optical characteristics of each lens can be maintained at the time of focus detection. Therefore, accurate focus detection is ensured. At the time of manual focusing, the operator drives the lenses while simultaneously observing the object image passing through the driving lens. In this case as well, the lenses are moved in accordance with the object distances predetermined beforehand, so that reliable and pleasant manual focusing is ensured.

Moreover, even if the present distance and the target distance differ greatly from each other, the lenses are prevented from colliding with each other since their positions are controlled in accordance with intermediate distances.

As has been described, according to the fifth and sixth embodiments of the present invention, a plurality of lens groups can be driven independently of one another such that they maintain predetermined positional relationships. Thus, it is possible to provide a lens barrel-driving control apparatus which can drive lens groups while simultaneously maintaining predetermined positional relationships among them at the time of focus detection or focus adjustment, and which therefore ensures accurate focus detection or focus adjustment.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An optical lens system-driving control apparatus, comprising:
    a plurality of lens groups movably provided along in a direction of an optical axis therebetween;
    a plurality of motors provided in order to drive the plurality of lens groups, respectively;
    single driving circuit means for selectively driving the plurality of motors by applying power to at least two of the plurality of motors;
    switching means, arranged between the plurality of motors and the single driving circuit means, for sequentially selecting one of the plurality of motors and electrically connecting a selected motor to the single driving circuit means;
    a plurality of lens position-detecting means provided in order to detect positions of the plurality of lens groups, respectively;
    final target position data-outputting means for outputting final target position data which represents a final target position corresponding to each of the plurality of lens groups;
    intermediate target position data-outputting means for outputting intermediate target position data which represents a intermediate target position of each of the plurality of lens groups, said intermediate target position being intermediate between a present position and the final target position and microscopically separated from the present position; and
    driving control means for sequentially and microscopically driving and controlling the plurality of lens groups to the final target position, respectively, via the switching means and the single driving circuit means, said driving control means having means for sequentially driving the plurality of lens groups to the intermediate target position in accordance with first intermediate target position data output by the intermediate target position data-outputting means, respectively, then demanding next intermediate target position data corresponding to a next intermediate position which is slightly away from the intermediate target position when the lens position-detecting means detects that the plurality of lens groups have reached intermediate target position, respectively, then sequentially driving the plurality of lens groups to the next intermediate target position in accordance with the next intermediate target position data, respectively, and then repeating similar control until the plurality of lens groups are moved to the final target position, respectively.

2. An apparatus according to claim 1, wherein said intermediate target position data-outputting means includes means for outputting next intermediate target position data indicating a position slightly away from that of previous intermediate target position, when the lens position-detecting means detects that the plurality of lens groups have reached the previous intermediate target position, respectively, and for repeatedly outputting next intermediate target position data until the plurality of lens groups reach the final target position, respectively.

3. A lens-driving apparatus for driving a plurality of lens groups, which are movably provided along in a direction of an optical axis therebetween, independently of one another and in accordance with an operation signal generated from a manual operating member, so as to perform focusing and zooming adjustments, said lens-driving apparatus comprising:
    detecting means for detecting a present position of each of the plurality of lens groups;
    output means for outputting data representing a target driving position which corresponds to each of the plurality of lens groups and is slightly away from the present position, in accordance with a detection result from the detecting means;

driving means for driving each of the plurality of lens groups to its target driving position in accordance with the data output by the output means; and means for repeatedly operating the detecting means, the output means, and the driving means while the manual operating member is being operated.

4. A lens-driving apparatus according to claim 3, wherein said output means includes means for calculating and outputting data which represents a target driving position of a reference lens group included in said plurality of lens groups, in accordance with an adjusting direction of the manual operating member and a predetermined minute driving distance, and for outputting data which represents target driving positions of remaining lens groups such that the target driving positions of the remaining groups have predetermined relationships with reference to the target driving position of the reference lens group.

5. A lens-driving apparatus according to claim 3, wherein said driving means includes:
   a plurality of motors for driving the plurality of lens groups, respectively;
   driving signal output means for outputting a motor-driving signal;
   switching means for allowing the motor-driving signal to be supplied to a selected one of the plurality of motors; and
   driving control means for controlling the driving signal output means and the switching means such that the lens groups are driven to their respective target positions on a time-divisional basis.

6. A lens-driving apparatus according to claim 3, wherein said driving means includes mean for driving the plurality of lens groups one by one on a time-divisional basis.

7. A control method used in a lens-driving apparatus wherein a plurality of lens groups movably provided along in a direction of an optical axis therebetween are driven independently of one another, said control method comprising:
   a first step of outputting data representing a final target position of each of the plurality of lens groups;
   a second step of outputting data representing a target driving position which corresponds to each of the plurality lens groups and is slightly away from a present position;
   a third step of sequentially driving the plurality of lens groups to the target driving position in accordance with the data output in the second step, respectively; and
   a fourth step of determining whether or not the plurality of lens groups have reached the final target position, respectively, and of executing the first, second and third steps once again if the plurality of lens groups have not yet reached the final target position, respectively, and bringing control to an end if the plurality of lens groups have reached the final target position, respectively.

8. A control method used in a lens-driving apparatus wherein a plurality of lens groups are driven independently of one another in accordance with an operation signal which is generated from a manual operating member used for focusing and zooming adjustments, said control method comprising the steps of:
   detecting a present position of each of the plurality of lens groups;
   determining a target driving position of a reference lens group included in said plurality of lens groups, said target driving position being slightly away from a present position by a predetermined distance;
   determining target driving positions of remaining lens groups in accordance with the target driving position of the reference lens group;
   driving the plurality of lens groups to the target driving position, respectively; and
   repeating the above steps while the manual operating member is being operated.

9. A lens-driving apparatus wherein a plurality of lens groups are driven to final target positions independently of one another and in accordance with a focus detection signal output from focus-detecting means, said lens-driving apparatus comprising:
   detecting means for detecting present positions of the plurality of lens groups;
   first determination means for determining a temporary driving position of a reference lens group included in said plurality of lens groups, said temporary driving position being slightly away from a present position by a predetermined distance;
   second determination means for determining target driving positions of remaining lens groups in accordance with the temporary driving position which the first determination means determines with respect to the reference lens group;
   driving means for driving the plurality of lens groups to the target driving positions determined by the second determination means; and
   means for repeatedly operating the detecting means, the first and second determination means, the driving means in accordance with detection performed by the detecting means, until the plurality of lens groups reach the final target positions.

10. A lens-driving apparatus according to claim 9, wherein said second determination means includes means for storing data representing those positions which the lens groups other than the reference lens group should take in accordance with the position of the reference lens group.

11. A lens-driving apparatus according to claim 9, wherein said second determination means includes:
   means for storing coefficients which are applied to a predetermined calculation formula, so as to determine those positions that the lens groups other than the reference lens group should take in accordance with the position of the reference lens group; and
   means for calculating data representing the positions of the lens groups other than the reference lens groups, in accordance with data representing the position of the reference lens and the coefficients stored in the storing means.

12. An optical lens system-driving control apparatus, comprising:
   a plurality of lens groups movably provided along in a direction of an optical axis therebetween;
   a plurality of motors provided in order to drive the plurality of lens groups, respectively;
   driving circuit means for driving the plurality of motors by applying power to the plurality of motors;
   a plurality of lens position detecting means provided in order to detect positions of the plurality of lens groups, respectively;

final target position data-outputting means for outputting final target position data which represents a final target position corresponding to each of the plurality of lens groups;

intermediate target position data-outputting means for outputting intermediate target position data which represents an intermediate target position of each of the plurality of lens groups, said intermediate target position being intermediate between a present position and the final target position and slightly away from the present position; and driving control means for simultaneously and microscopically driving and controlling the plurality of lens groups to the final target position, respectively, via the driving circuit means, said driving control means having means for driving the plurality of lens groups substantially at one time to the intermediate target position in accordance with the intermediate target position data output by the intermediate target position data-outputting means, respectively, then demanding next intermediate target position data corresponding to a next intermediate position which is slightly away from the intermediate target when the lens position-detecting means detects that the plurality of lens groups have reached the intermediate target position, respectively, then driving the plurality of lens groups substantially at one time to the next second intermediate target position in accordance with the next intermediate target position data, respectively, and then repeating similar control until the plurality of lens groups are moved to the final target position, respectively.

13. An apparatus according to claim 12, wherein said intermediate target position data-outputting means includes means for outputting next intermediate target position data indicating a position slightly away from that of previous intermediate target position data, when the lens position-detecting means detects that the plurality of lens groups have reached the previous intermediate target position, respectively, and for repeatedly outputting next intermediate target position data until the plurality of lens groups reach the final target position, respectively.

14. A lens-driving apparatus wherein focus adjustment is performed by driving a plurality of lens groups, movably provided along in a direction of an optical axis therebetween, independently of one another and in accordance with object distance data output by focus-detecting means, said lens-driving apparatus comprising:

memory means for storing data representing optimal positional relationships which the plurality of lens groups should have with reference to a distance to an object;

means for determining a temporary target focusing position which is located between a present position and a final focusing position corresponding to the object distance data and which is slightly away from the present position;

means for determining driving positions of the plurality of lens groups by referring to the data stored in the memory means on the basis of the temporary target focusing position;

means for driving the plurality of lens groups to the driving positions; and means for moving the plurality of lens groups to the final focusing position by repeatedly driving the lens groups to the temporary target focusing position.

15. An optical lens-driving control apparatus, comprising:

a plurality of lens groups movably provided along in a direction of an optical axis therebetween, for focusing operation;

a plurality of motors provided in order to drive the plurality of lens group, respectively;

driving circuit means for driving the plurality of motors by applying power to the plurality of motors;

distance-measuring means for measuring a distance to an object and outputting distance data;

an auto focus operation member with which to command the start of a focusing operation in accordance with an output of the distance-measuring means;

intermediate target position data-outputting means for outputting data on an intermediate target position in response to the start of the focusing operation, said intermediate target position being intermediate between a present position and a final target driving position calculated from the output of the distance-measuring means and being slightly away from the present position; and control means for supplying a control signal to the driving circuit means, so as to drive the motors in accordance with the data on the intermediate target position data, for further driving the plurality of lens groups to a next target intermediate position which is slightly away from the intermediate target position when the lens groups have reached the intermediate target position, and for repeating minute driving of the lens groups until the plurality of lens groups are moved to the final target driving position.

16. An apparatus according to claim 15, wherein said intermediate target position data-outputting means includes means for outputting data on data on the next target intermediate position which is slightly away from the target intermediate data initially-output and for repeatedly outputting data on intermediate target positions, which are slightly away from each other, until the plurality of lens groups are moved to the final target driving position.

17. An apparatus according to claim 15, further comprising:

a switching circuit, arranged between the driving circuit means and the plurality of motors, for allowing an output of the driving circuit means to be selectively supplied to one of the plurality of motors; and means for determining distances for which the plurality of motors should drive the plurality of lens groups on the basis of data representing the intermediate target position, respectively, for selecting one of the plurality of motors, and for supplying a control signal to the switching circuit so as to drive a selected motor in accordance with the corresponding determined distance.

18. An apparatus according to claim 15, wherein: said driving circuit means is connected to each of the plurality of motors; and said control means includes means for driving the plurality of lens groups to the intermediate target positions by simultaneously driving the plurality of motors, respectively.

19. An optical lens-driving control apparatus, comprising:
- a plurality of lens groups movably provided along in a direction of an optical axis therebetween;
- a plurality of motors provided in order to drive the plurality of lens group, respectively;
- driving circuit means for driving the plurality of motors by applying power to the plurality of motors;
- final target position data-outputting means for outputting final target position data which represents a final target position;
- intermediate target position data-outputting means for outputting intermediate target position data which represents an intermediate target position, said intermediate target position being intermediate between a present position and the final target position; and
- control means for supplying a control signal to the driving circuit means, so as to move the plurality of lens groups to the final target position by way of the intermediate target position.

20. A lens-driving apparatus wherein a plurality of lens groups movably provided along in a direction of an optical axis therebetween are driven, for focus adjustment, independently of one another and in accordance with object distance data, comprising:
- means for outputting present object distance data;
- means for outputting final target object distance data;
- means for outputting intermediate target object distance data on the basis of the present object distance data and the target object distance data;
- first detection means for detecting a present position of each of the plurality of lens groups;
- memory means for storing data representing optimal positional relationships which the plurality of lens groups should have with reference to an object distance;
- means for reading, out of the memory means, data representing intermediate target positions at which the plurality of lens groups should be situated in accordance with the intermediate target object distance data;
- means for driving the plurality of lens groups independently of one another, in accordance with an output of the first detection means and the data which is read out of the memory means and represents the intermediate target positions;
- second detection means for detecting that the plurality of lens groups have reached the intermediate target positions; and
- means for updating the intermediate target object distance data in accordance with detection performed by the second detection means such that the intermediate target object distance data approaches the final target object distance data,
- said plurality of lens groups maintaining optimal positional relationships when the plurality of lens groups are being moved in accordance with the target object distance data.

21. A lens-driving apparatus wherein a plurality of lens groups movably provided along in a direction of an optical axis therebetween are driven, for focusing adjustment, independently of one another and in accordance with focusing distance data, comprising:
- means for outputting present focusing distance data;
- means for outputting final target focusing distance data;
- means for outputting intermediate target focusing distance data on the basis of the present focusing distance data and the target focusing distance data;
- first detection means for detecting a present position of each of the plurality of lens groups;
- memory means for storing data representing optimal positional relationships which the plurality of lens groups should have with reference to a focusing distance;
- means for reading, out of the memory means, data representing intermediate target positions at which the plurality of lens groups should be situated in accordance with the intermediate target focusing distance data;
- means for driving the lens groups independently of one another, in accordance with an output of the first detection means and the data which is read out of the memory means and represents the intermediate target positions;
- second detection means for detecting that the lens plurality of groups have reached the intermediate target positions; and
- means for updating the intermediate target focusing distance data in accordance with detection performed by the second detection means such that the intermediate target focusing distance data approaches the final target focusing data,
- said plurality of lens groups maintaining optimal positional relationships when the plurality of lens groups are being moved in accordance with the target focusing distance data.

22. A lens-driving apparatus wherein a plurality of lens groups movably provided along in a direction of an optical axis therebetween are driven independently of one another, comprising:
- means for outputting first data representing present positional relationships among the plurality of lens groups;
- means for outputting second data representing final target positional relationships among the plurality of lens groups;
- means for outputting third data which is intermediate between the first data and the second data;
- first detection means for detecting a present position of each of the plurality of lens groups;
- memory means for storing data representing optimal positional relationships among the plurality of lens groups;
- means for supplying the third data to the memory means and reading intermediate position data;
- means for driving the plurality of lens groups independently of one another, in accordance with an output of the first detection means and the intermediate position data read out of the memory means;
- second detection means for detecting that the lens groups have reached positions indicated by the intermediate position data; and
- means for updating the third data in accordance with detection performed by the second detection means such that the third data approaches the second data,
- said plurality of lens groups maintaining optimal positional relationships when the plurality lens groups are being to final target positions.

23. A lens-driving apparatus, comprising:
- a plurality of lens groups movably provided along in a direction of an optical axis therebetween;

a plurality of motors provided in order to drive the plurality of lens groups, respectively;

a single driving circuit for driving the plurality of motors by applying power to the plurality of motors;

a switching circuit, arranged between the single driving circuit and the plurality of motors, for allowing an output of the single driving circuit to be selectively supplied to one of the plurality of motors; and a control circuit for determining distances with respect to the plurality of motors, for sequentially selecting one of the plurality of motors, and for supplying a control signal to the switching circuit so as to drive a selected motor in accordance with the corresponding determined distance.

24. A lens-driving apparatus, comprising:

a plurality of lens groups;

a plurality of motors provided for the plurality of lens groups, respectively;

a driving circuit for driving the plurality of motors;

a switching circuit, arranged between the driving circuit and the plurality of motors, for allowing an output of the driving circuit to be selectively supplied to one of the plurality of motors; and a control circuit for determining distances with respect to the plurality of motors, for sequentially selecting a predetermined number of motors out of said plurality of motors, and for supplying a control signal to the switching circuit so as to drive the selected motors in accordance with the corresponding determined distance.

* * * * *